United States Patent [19]
Kumagai et al.

[11] Patent Number: 5,867,887
[45] Date of Patent: *Feb. 9, 1999

[54] MANUFACTURING METHOD FOR MAGNETIC HEAD

[75] Inventors: Seiji Kumagai; Masatoshi Hayakawa; Yoshito Ikeda; Junichi Honda, all of Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 745,304

[22] Filed: Nov. 12, 1996

Related U.S. Application Data

[63] Continuation of Ser. No. 400,187, Mar. 6, 1995, abandoned, which is a continuation of Ser. No. 19,640, Feb. 18, 1993, abandoned.

[30] Foreign Application Priority Data

Feb. 19, 1992 [JP] Japan .................................. 4-069732
Mar. 19, 1992 [JP] Japan .................................. 4-093530
Jul. 16, 1992 [JP] Japan .................................. 4-212214
Dec. 18, 1992 [JP] Japan .................................. 4-354979

[51] Int. Cl.$^6$ .................................................. G11B 5/42
[52] U.S. Cl. ...................................... 29/603.08; 29/603.21
[58] Field of Search .............................. 29/603.08, 603.2, 29/603.21, 603.22; 360/119–121

[56] References Cited

U.S. PATENT DOCUMENTS

| | | | |
|---|---|---|---|
| 3,577,634 | 5/1971 | Secrist | 29/603 |
| 3,584,378 | 6/1971 | Duinker et al. | 29/603 |
| 4,611,259 | 9/1986 | Schiller | 29/603 X |
| 4,821,406 | 4/1989 | Ota | 29/603 |
| 5,084,129 | 1/1992 | Fukuda et al. | 29/603 X |
| 5,161,300 | 11/1992 | Nanjo | 29/603 |

*Primary Examiner*—Carl E. Hall
*Attorney, Agent, or Firm*—Hill & Simpson

[57] ABSTRACT

A method of manufacturing a magnetic head by bonding a pair of magnetic cores to each other, wherein a residual stress in the magnetic cores upon bonding them together is controlled so that a permeability of the magnetic cores in the vicinity of a magnetic recording medium sliding surface of the magnetic cores may become maximum. Accordingly, the residual stress in the magnetic cores is controlled so that the permeability of the magnetic cores may surely become maximum after forming the magnetic head, thereby ensuring a superior reproduction efficiency of the magnetic head.

9 Claims, 29 Drawing Sheets

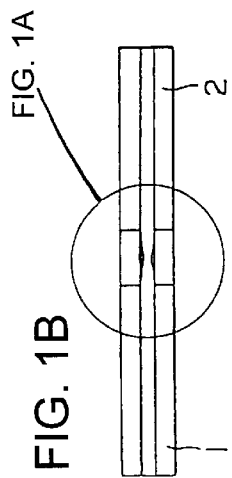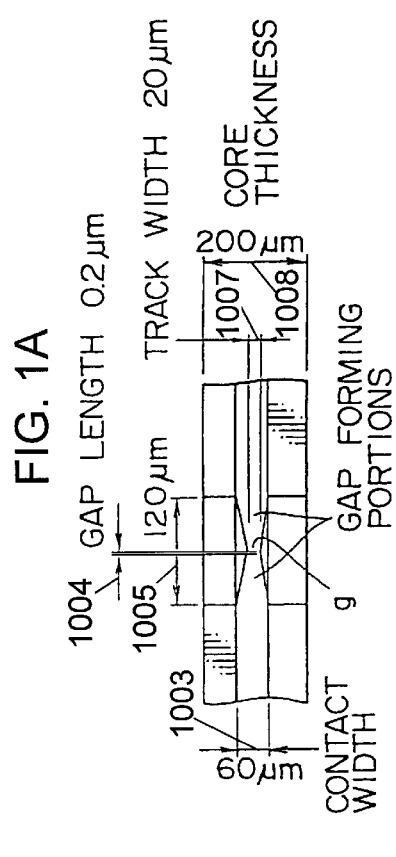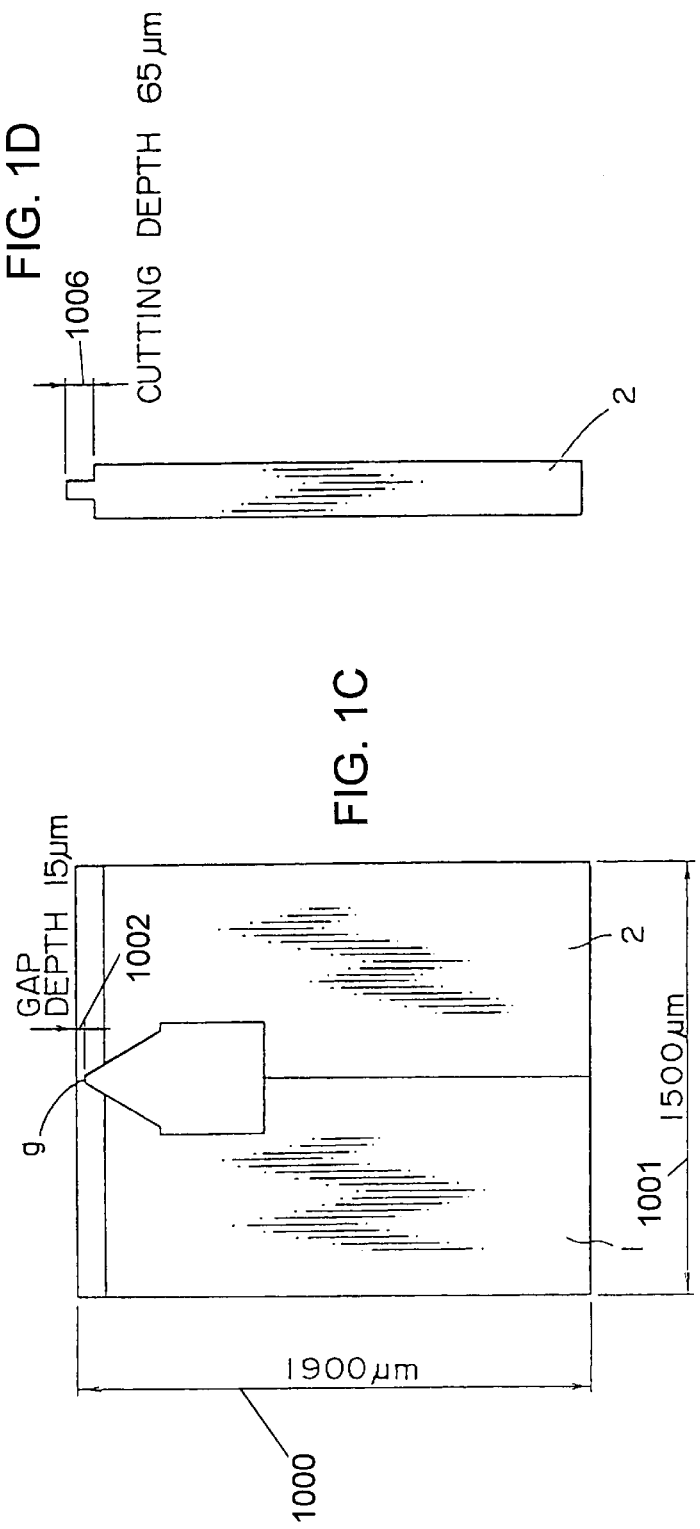

MONOCRYSTAL FERRITE WITH ORIENTATION OF <100>
ANALYTIC COMPOSITION : 55mol%Fe$_2$O$_3$, 22mol%MnO MONOCRYSTAL FERRITE WITH ORIENTATION OF <111>
ANALYTIC COMPOSITION : 55mol%Fe$_2$O$_3$, 22mol%MnO MONOCRYSTAL FERRITE WITH ORIENTATION OF <211>
ANALYTIC COMPOSITION : 55mol%$Fe_2O_3$, 22mol%MnO

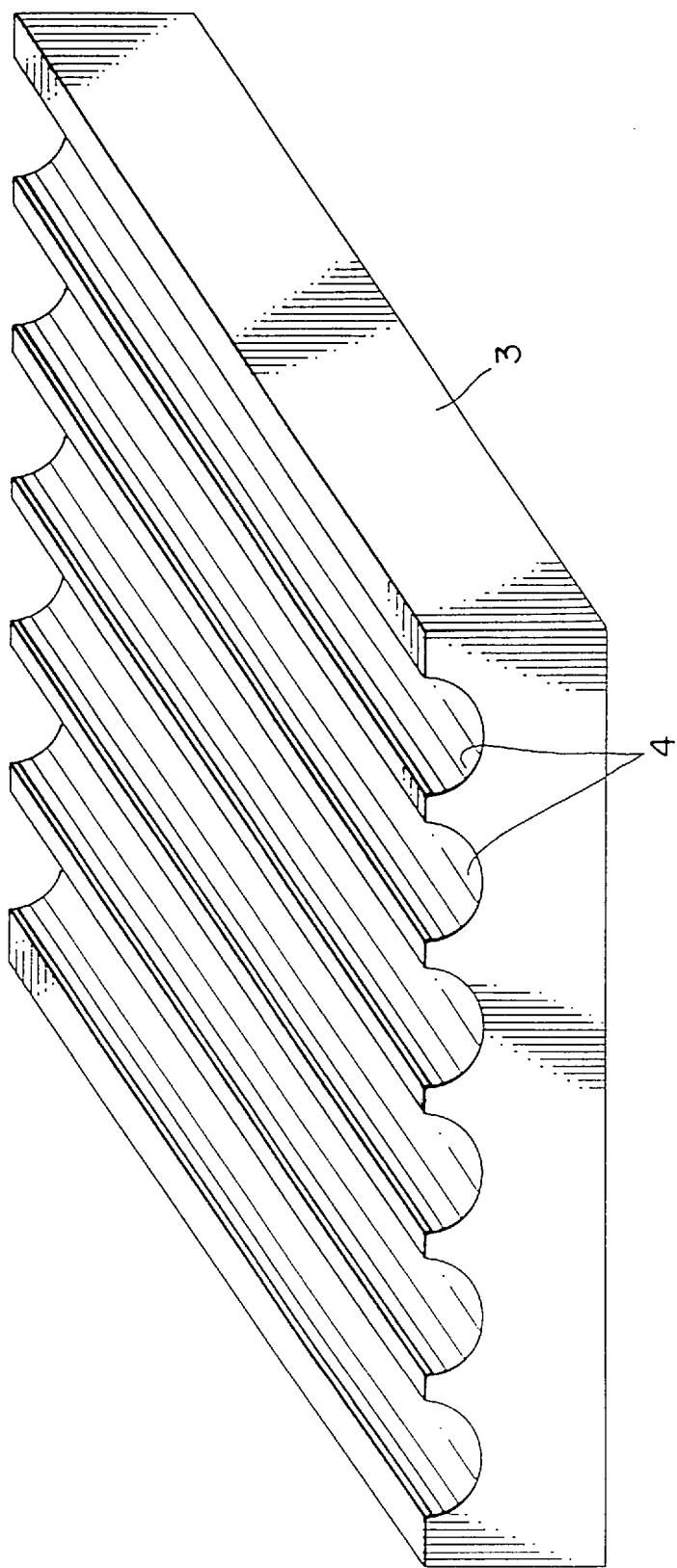
F I G. 12

MANUFACTURING METHOD FOR MAGNETIC HEAD

This is a continuation of application Ser. No. 08/400,187 filed Mar. 6, 1995, (now abandoned), which is a continuation of application Ser. No. 08/019,640 filed Feb. 18, 1993, (now abandoned).

BACKGROUND OF THE INVENTION

The present invention relates to a manufacturing method for a magnetic head, and more particularly to a manufacturing method for a magnetic head using a magnetic core formed of monocrystal ferrite or combined monocrystal ferrite and polycrystal ferrite.

A magnetic head to be mounted in a magnetic recording and reproducing device such as a VTR (video tape recorder) is constituted of a coil and a magnetic core formed of a magnetic material such as monocrystal ferrite. Such a magnetic head using a magnetic core formed of ferrite is called a ferrite head, and it is generally used in the art.

FIG. 25 shows a structure of such a magnetic head in the related art. Referring to FIG. 25, reference numerals 207 and 208 designate a pair of magnetic cores bonded to each other. The magnetic cores 207 and 208 are formed with track width defining grooves 201 and 202, respectively, for defining a track width. The magnetic core 207 has a front gap forming surface 203 and a back gap forming surface 205, and the magnetic core 208 has a front gap forming surface 204 and a back gap forming surface 206. The front gap forming surface 203 of the magnetic core 207 faces the front gap forming surface 204 of the magnetic core 208 to form a front gap $g_3$ therebetween. Similarly, the back gap forming surface 205 of the magnetic core 207 faces the back gap forming surface 206 of the magnetic core 208 to form a back gap $g_4$ therebetween. Further, the grooves 201 of the magnetic core 207 face the grooves 202 of the magnetic core 208. Gap films 209 and 210 are formed on the opposed surfaces of the magnetic cores 207 and 208, respectively. A fusing glass 211 as a nonmagnetic material is filled in the vicinity of the front gap $g_3$ and the back gap $g_4$ to bond both the magnetic cores 207 and 208 each other. Further, the opposed surfaces of the magnetic cores 207 and 208 between the front gap $g_3$ and the back gap $g_4$ are formed with coil grooves 212 and 213 for receiving coils, respectively.

The magnetic head shown in FIG. 25 is manufactured by the following method. Firsts as shown in FIG. 26, a substrate 214 formed of monocrystal ferrite or combined monocrystal ferrite and polycrystal ferrite is prepared, and a plurality of track width defining grooves 215 for defining a track width of the magnetic head are formed on an upper surface of the substrate 214 so as to be arranged at a given pitch in a lateral direction of the substrate 214 and extend in a longitudinal direction of the substrate 214. Each groove 215 has a substantially semi-circular cross section.

Then, as shown in FIG. 27, coil grooves 216 and 217 for receiving coils and glass grooves 218 and 219 for receiving glass are formed on the upper surface of the substrate 214 so as to be arranged at a given pitch in the longitudinal direction of the substrate 214 and extend in the lateral direction of the substrate 214. Each of the coil grooves 216 and 217 has a substantially trapezoidal cross section, and each of the glass grooves 218 and 219 has a substantially U-shaped cross section. Thus, the coil grooves 216 and 217 and the glass grooves 218 and 219 extend in orthogonal relationship to the track width defining grooves 215 on the upper surface of the substrate 214.

Then, the substrate 214 is divided into a block 220 having the coil groove 216 and the glass groove 218 as shown in FIG. 28 and a block 221 having the coil groove 217 and the glass groove 219 as shown in FIG. 29.

Then, as shown in FIG. 28, a gap film 222 of a nonmagnetic material such as $SiO_2$ is formed on the upper surface of the block 220 except the inner surfaces of the coil grooves 216 and the glass grooves 218 so as to have a thickness about half a gap length of the magnetic head by using a suitable thin film forming technique such as a magnetron sputtering process, thus forming a plurality of front gap forming surfaces 223 and a plurality of back gap forming surfaces 225. Similarly, a gap film 227 is formed on the upper surface of the block 221 to form a plurality of front gap forming surfaces 224 and a plurality of back gap forming surfaces 226 (see FIG. 29).

Then, as shown in FIG. 29, both the blocks 220 and 221 are matched with each other so that the front gap forming surfaces 223 and 224 face each other and the back gap forming surfaces 225 and 226 face each other.

Then, glass rods formed of a fusing glass are inserted into a space defined by the coil grooves 216 and 217 and a space defined by the glass grooves 218 and 219, and the glass rods are then fused at a given temperature under a pressure of about tens of MPa applied in opposite directions depicted by arrows $P_2$ in FIG. 29.

Accordingly, a fusing glass 231 is filled in the vicinity of a plurality of front gaps defined between the front gap forming surfaces 223 and 224, in the vicinity of a plurality of back gaps defined between the back gap forming surfaces 225 and 226, and in a plurality of spaces defined by the track width defining grooves 215 and 230. Thus, the front gaps and the back gaps functioning as recording and reproducing gaps are formed between the front gap forming surfaces 223 and 224 and between the back gap forming surfaces 225 and 226, respectively.

Then, a tape sliding surface 232 of the combined blocks 220 and 221 is subjected to cylindrical grinding.

Finally, the integrated body of the blocks 220 and 221 is cut into chips, and coils are located in the coil grooves 216 and 217 of each chip, thereby obtaining the magnetic head shown in FIG. 25.

However, there occur various strains in the monocrystal ferrite in the above manufacturing process. The strains cause a great reduction in permeability of the magnetic cores to reduce a reproduction efficiency of the magnetic head.

In the magnetic head to be manufactured by the above method for example, the pair of blocks 220 and 221 forming the pair of magnetic cores 207 and 208 are bonded together by matching the blocks 220 and 221 and fusing the fusing glass 231 as a nonmagnetic material with heat and pressure to fill the fusing glass 231 between the blocks 220 and 221. In most cases, the blocks 220 and 221 before matching are curved. Accordingly, if the blocks 220 and 221 are merely matched with each other, full-face contact between the front gap forming surfaces 223 and 224 and full-face contact between the back gap forming surfaces 225 and 226 cannot be obtained to cause opening of the magnetic gap. To cope with this problem, a given pressure (e.g., about tens of MPa) is applied to the blocks 220 and 221 in heating the fusing glass 231 and filling it between the blocks 220 and 221, thereby eliminating the curvature of the blocks 220 and 221 to form a desired magnetic gap.

However, this pressure is concentrated at the magnetic gap forming portion formed of monocrystal ferrite or combined monocrystal ferrite and polycrystal ferrite as a magnetic material for forming the blocks 220 and 221. As a result, even after bonding the blocks 220 and 221, an internal residual stress exists in the ferrite forming the magnetic gap forming portion. Therefore, a magneto-mechanical coupling effect due to the residual stress causes a reduction in permeability of the magnetic cores to reduce the reproduction efficiency of the magnetic head.

In recent years, it has been demanded to reduce a track width of the magnetic head in response to a demand for high-density recording. The reduction in the track width results in an increase in the stress applied to the ferrite forming the magnetic gap forming portion. Accordingly, a large strain occurs in the magnetic gap forming portion to reduce the permeability of the ferrite and reduce the reproduction efficiency of the magnetic head. In particular, when the track width is about 20 $\mu$m or less, the above problem becomes remarkable.

Hitherto, there does not exist a method for quantitatively relating a reduction in permeability of a ferrite material due to a residual stress to a reduction in reproduction output of an actual magnetic head. Accordingly, it is necessary to actually make a magnetic head and measure a reproduction output of the magnetic head, so as to determine how the residual stress generating in forming the magnetic gap reduces the reproduction output. Thus, in the present circumstances, it is impossible to establish a definite guideline for designing in relation to the stress. Further, a stress dependency of permeability in monocrystal ferrite may change with a crystal orientation of the ferrite. That is, in designing a magnetic head employing monocrystal ferrite, it is necessary to decide a cutting face orientation of the monocrystal ferrite in consideration of an aspect of workability and wear resistance and another aspect of reproduction output and recording characteristic. It is further necessary to control the residual stress in the manufacturing process, so as to prevent a deterioration in magnetic characteristics of the ferrite. Thus, such a series of operations must be carried out by trial and error.

SUMMARY OF THE INVENTION

It is accordingly an object of the present invention to provide a manufacturing method for a magnetic head which can control the residual stress in the magnetic cores so that the permeability of the magnetic cores may surely become maximum after forming the magnetic head, thereby ensuring a superior reproduction efficiency of the magnetic head.

According to a first aspect of the present invention, there is provided a method of manufacturing a magnetic head by bonding a pair of magnetic cores to each other, wherein a residual stress in said magnetic cores upon bonding them together is controlled so that a permeability of said magnetic cores in the vicinity of a magnetic recording medium sliding surface of said magnetic cores may become maximum.

According to a second aspect of the present invention, there is provided in a method of manufacturing a magnetic head by bonding a pair of magnetic cores to each other with a magnetic gap defined therebetween to form a closed magnetic circuit; the improvement comprising the steps of bonding a pair of magnetic gap forming portions of said magnetic cores to each other and then filling a nonmagnetic material in the vicinity of said magnetic gap.

According to a third aspect of the present invention, there is provided a method of manufacturing a magnetic head, comprising the steps of forming a plurality of track width defining grooves at a given pitch on each of a pair of magnetic core substrates so that a flat portion having a width at least three times a track width remains on each of said magnetic core substrates; forming a coil groove for receiving a coil on each of said magnetic core substrates so that said coil groove extends in substantially orthogonal relationship to said track width defining grooves; bonding said pair of magnetic core substrates to each other to form an integral body so that said track width defining grooves of both said magnetic core substrates come into registration with each other; and cutting said integral body into a head chip.

The present inventors have found that a reproduction output of a magnetic head can be improved by measuring a permeability of a magnetic core material (especially, monocrystal ferrite) under the stress applied condition, quantifying an influence of the stress on the permeability, obtaining a stress value corresponding to a maximum permeability of the ferrite in the vicinity of a magnetic recording medium sliding surface in a sliding direction before forming the magnetic head on the basis of the above influence, and setting a residual stress of the ferrite after forming the magnetic head to the above stress value, thus achieving the present invention. The present invention will now be described in detail.

1. Relation between a permeability of a ferrite head in the vicinity of a magnetic gap and a reproduction efficiency of the ferrite head The permeability and the reproduction efficiency were analyzed by using a magnetic head as shown in FIG. 1. The magnetic head is constructed of a pair of monocrystal ferrite cores 1 and 2. A magnetic gap g is formed between the magnetic cores 1 and 2 on a magnetic recording medium sliding surface thereof. The magnetic head has the following dimensions.

Magnetic gap length: 0.2 $\mu$m

Magnetic gap depth: 15 $\mu$m

Track width: 20 $\mu$m

Cutting depth: 65 $\mu$m

The analysis was carried out by using this ferrite head under the following conditions.

(1) Program

Hardware: CPU: NWS-1860 (manufactured by SONY)

Software: three-dimensional magnetic field analysis software using a finite element method (Maxwell manufactured by Ansoft)

(2) Calculation

A magnetic flux density Bg in the magnetic gap was obtained by simulation, and a head efficiency η was obtained from a maximum value of the magnetic flux density Bg. Further, a head inductance L was obtained from a magnetic flux density Bc and a sectional area Sc of the ferrite cores, and a head efficiency per unit inductance was calculated. This value corresponds to an actual level of a head output. The calculation was carried out in accordance with the following expressions.

$$\eta = (Hg \times Gap)/(I \times N)$$

$$Hg = Bg/\mu_o$$

where,

η: head efficiency

Hg: magnetic field in the gap [A/m]

Bg: magnetic flux density in the gap [T]

$\mu_o$: space permeability

Gap: gap length [m]

I: current [A]

N: number of turns

L=(Bc×Sc)/$I_A$ (per turn)

where,

L: head inductance [H]

Bc: magnetic flux density in the magnetic cores [T]

Sc: sectional area of the magnetic cores [m$^2$]

$I_A$: total Current [AT]

(3) Calculation conditions

Sectional area of coils: Scoil=150×330 [μm$^2$]

Current: 10 mAT/10 turns for each coil

Current density: 202020 [A/m$^2$]

Boundary condition: fixed boundary condition,

B=0 at infinity (using an infinite boundary element)

(4) Permeability

The permeability of the ferrite at a portion in the vicinity of the gap (see FIG. 1) was changed in the range of 100 to 500.

The relation between the permeability in the vicinity of the magnetic gap and the head efficiency per unit inductance ($\eta/L^{1/2}$) obtained by the simulation under the above conditions is shown in FIG. 2. As the inductance L changes with the number of turns, the head efficiency per unit inductance ($\eta/L^{1/2}$) corresponds to an actual head output.

(5) Other Dimensions

The following dimensions are illustrated in FIGS. 1A through 1D:

overall head height 1000 of 1900 μm;

overall head length 1001 of 1500 μm;

a magnetic gap depth 1002 of 15 μm;

a contact width 1003 of 60 μm;

a magnetic gap length 1004 of 0.2 μm;

a central contact area 1005 of 120 μm;

a cutting depth 1006 of 65 μm;

a track width 1007 of 20 μm; and an overall core thickness 1008 of 200 μm.

It is understood from FIG. 2 that the head output is dependent upon the permeability μ in the vicinity of the magnetic gap.

2. Stress and frequency dependencies of permeability

As shown in FIG. 3, a measuring sample S1 in the form of a rectangular parallelepiped elongated in a sliding direction of a magnetic recording medium (e.g., magnetic tape) was prepared in consideration of a direction of a magnetic flux in a bulk head and an orientation of a stress to be generated in the bulk head.

Actually, the sample S1 was attached to a crystallized glass plate, and a bending load was applied to the sample S1 in the longitudinal direction thereof so that the sample S1 on the upper or lower side of the glass plate may become convex on the upper side. In this stress applied condition, the permeability of the sample S1 in the longitudinal direction thereof was measured by using a network analyzer (41195A manufactured by Hewlett Packard).

As shown in FIG. 6, the sample S1 actually corresponds to a portion of the magnetic head in the vicinity of the magnetic recording medium sliding surface. In this case, a face orientation (100) of the ferrite crystal forming the sample S1 appears in the longitudinal direction of the sample S1, that is, in the sliding direction of the magnetic recording medium.

There is shown in FIG. 3 the result of measurement of the stress and frequency dependencies of the permeability of the sample S1 having the face orientation (100) appearing in the longitudinal direction of the sample S1.

Similarly, there is shown in FIG. 4 the result of measurement of the stress and frequency dependencies of the permeability of a sample S2 having a face orientation (111) appearing in the longitudinal direction of the sample S2. As shown in FIG. 7, the sample S2 actually corresponds to a portion of the magnetic head in the vicinity of the magnetic recording medium sliding surface. Further, there is shown in FIG. 5 the result of measurement of the stress and frequency dependencies of the permeability of a sample S3 having a face orientation (211) appearing in the longitudinal direction of the sample S3. As shown in FIG. 8, the sample S3 actually corresponds to a portion of the magnetic head in the vicinity of the magnetic recording medium sliding surface.

3. Relation between a stress and a head efficiency

The relation between a stress and a head efficiency as shown in FIG. 9 can be obtained by substituting the relation between the stress and the permeability of the monocrystal ferrite having a crystal orientation <100> in the longitudinal direction as shown in FIG. 3 for the relation between the permeability and the head efficiency as shown in FIG. 2. Similarly, the relation between a stress and a head efficiency in the crystal ferrite having a crystal orientation <111> in the longitudinal direction as shown in FIG. 4 and the crystal ferrite having a crystal orientation <211> in the longitudinal direction as shown in FIG. 5.

Further, FIG. 11 shows the relation between a efficiency and a head frequency to be obtained under a given stress in the ferrite heads having the crystal orientations <100> and <111>.

4. Relation to an actual head output (1) The case where a stress is changed

Using monocrystal ferrite having an analytic composition of 55 mol % Fe$_2$O$_3$, 22 mol % MnO, and 23 mol % ZnO and having a crystal orientation <100> in the longitudinal direction, two kinds of heads were prepared. That is, in one kind of head, compressive residual stress of 20 MPa acts in the vicinity of a magnetic gap in a tape sliding direction, and in the other kind of head, a compressive residual stress of 50 MPa acts in the vicinity of a magnetic gap in a tape sliding direction. There compressive residual stresses were adjusted by controlling a pressure to be applied in forming the magnetic heads. That is, in forming the magnetic head as shown in FIG. 29 as previously mentioned, the blocks 220 and 221 were matched with each other so that the front gap forming surfaces 223 and 224 faced each other and the back gap forming surfaces 225 and 226 faced each other. Then, the glass rods of fusing glass were inserted in the space defined between the coil grooves 216 and 217 and the space defined between the glass grooves 218 and 219, and were heated under the pressure of about tens of MPa in the opposite directions depicted by the arrows P$_2$ in FIG. 29, thereby filling the fusing glass 231 in the vicinity of the front gap and the back gap and in the track width defining grooves 215 and 230. The pressure to be applied to the blocks 220 and 221 in heating the glass rods was controlled to thereby adjust the compressive residual stress.

Using these magnetic heads, a reproduction output at 5 MHz was measured. As the result, the output of the magnetic head with the residual stress of 20 MPa was higher by 1.9 dB than that with the residual stress of 50 MPa. On the other hand, calculated values for the head efficiency ($\eta/L^{1/2}$) at 5 MHz were plotted in respect of a change in stress to obtain the result shown in FIG. 9.

It is understood from FIG. 9 that an output difference between 20 MPa and 50 MPa is 2.2 dB, which almost agrees with the measured value. Therefore, an actual head output can be predicted by a stress value in forming a magnetic head, and the process conditions enabling a maximum head output can be decided according to the predicted value.

(2) The case where a crystal orientation is changed

Two kinds of heads having the crystal orientations <100> and <111> in the tape sliding direction were prepared with a compressive residual stress of 50 MPa applied. A relative output of the head having the crystal orientation <111> to the head having the crystal orientation <100> is shown by circles in FIG. 11.

On the other hand, the relation between a head efficiency ($\eta/L^{1/2}$) and a frequency in each head was calculated from the data shown in FIG. 10 by using the aforementioned magnetic head analysis software, and the calculated values were plotted to obtain the result shown in FIG. 11 (the data shown corresponds to the case where a compressive residual stress of 47 MPa was actually applied, but it is almost the same as that in the case of 50 MPa).

Further, calculated values for the relative output of the head having the crystal orientation <111> to the head having the crystal orientation <100> were also plotted with crosses to obtain the result shown in FIG. 11. It is understood that the calculated values for the relative output well agree with the found values indicated by the circles in FIG. 11. Therefore, an actual head output can be predicted from the permeability of the ferrite regardless of a difference in crystal orientation. When the crystal orientation is changed, the stress value improving the head output is changed.

5. Method of controlling a stress

Thus, the relation between changes in permeability and magnetic head output both depending upon a stress in monocrystal ferrite in each crystal orientation thereof can be made definite. In view of this definite relation, the steps of working and assembling the magnetic cores, the physical values of the materials, the crystal orientation of the monocrystal ferrite, etc. are suitably selected to thereby control a residual stress in the magnetic cores upon bonding them together so that the permeability of the magnetic cores (specifically, the permeability in a sliding direction of a magnetic recording medium) in the vicinity of a magnetic recording medium sliding surface of the magnetic cores may become maximum, whereby a reproduction efficiency of the magnetic head can be improved.

In the conventional manufacturing method for the magnetic head as mentioned previously, a large stress is generated in the magnetic head in the step of bonding the magnetic cores to each other. That is, the magnetic cores are bonded together by a fusing glass as a nonmagnetic material in the presence of heat and pressure. At this time, a compressive stress remains as an internal stress in the magnetic cores, which is considered to reduce the permeability of the magnetic cores and therefore reduce the reproduction efficiency of the magnetic head.

According to the present invention, there is provided measures for controlling a residual stress in the magnetic cores upon bonding them together so that the permeability of the magnetic cores (specifically, the permeability in the magnetic recording medium sliding direction) in the vicinity of the magnetic recording medium sliding surface of the magnetic cores may become maximum. As one specific example of the measures, in a manufacturing method for a magnetic head by bonding a pair of magnetic cores to each other with a magnetic gap defined therebetween to form a closed magnetic circuit, it is featured that the manufacturing method comprises the first step of bonding a pair of magnetic gap forming portions of the magnetic cores to each other and the second step of filling a nonmagnetic material in the vicinity of the magnetic gap after the first step.

The magnetic cores may be formed of a known magnetic material generally used in manufacture of a magnetic head, such as monocrystal ferrite or combined monocrystal ferrite and polycrystal ferrite. It is preferable that the magnetic gap forming portions are bonded together by a fusing glass. Further, it is preferable that the nonmagnetic material to be filled in the vicinity of the magnetic gap is a fusing glass having a glass transition point lower than a flexure point of the fusing glass to be used for bonding of the magnetic gap forming portions.

While the fusing glass to be used for bonding of the magnetic gap forming portions may be a known fusing glass generally used for manufacture of a magnetic head, it is preferable that the fusing glass has a bonding ability and a relatively high flexure point. Further, a base layer such as an $SiO_2$ film may be interposed between the fusing glass and the magnetic cores. Further, while the nonmagnetic material to be filled in the vicinity of the magnetic gap may be a known nonmagnetic material such as $SiO_2$ generally used for manufacture of a magnetic head, it is preferable that the nonmagnetic material has a relatively low glass transition point.

Further, the bonding of the magnetic gap forming portions may be effected by thermal diffusion of a metal film at low temperatures. The metal film may be formed of Au, Ag, Pt, Pb, etc. Further, a base layer such as an $SiO_2$ film or a Cr film may be interposed between the metal film and the magnetic cores. For example, a composite thin film composed of an $SiO_2$ film and an Au film or composed of a Cr film and an Au film may be used for the bonding of the magnetic gap forming portions. The composite thin film may be formed by a known thin film forming technique such as a sputtering process.

As another specific example of the measures to more easily control the stress by reducing the pressure to be applied to the magnetic cores upon bonding them together to thereby reduce the stress remaining in the magnetic cores, it is featured that the manufacturing method for the magnetic head according to the present invention comprises the steps of forming a plurality of track width defining grooves at a given pitch on each of a pair of magnetic core substrates so that a flat portion having a width at least three times a track width remains on each magnetic core substrate, forming a coil groove for receiving a coil on each magnetic core substrate so that the coil groove extends in substantially orthogonal relationship to the track width defining grooves, bonding the pair of magnetic core substrates to each other to form an integral body so that the track width defining grooves of both the magnetic core substrates come into registration with each other, and cutting the integral body into a head chip.

As described above, in the manufacturing method for the magnetic head by bonding a pair of magnetic cores to each other, the residual stress in the magnetic cores upon bonding them together is controlled so that the permeability of the magnetic cores (specifically, the permeability in the magnetic recording medium sliding direction) in the vicinity of the magnetic recording medium sliding surface of the magnetic cores. Accordingly, the permeability of the magnetic cores after forming the magnetic head can be made surely maximum, and the reproduction efficiency of the magnetic head can be greatly improved.

Further, after the magnetic gap forming portions of the magnetic cores are bonded to each other, the nonmagnetic material is filled in the vicinity of the magnetic gap. Accordingly, the pressure to be applied to the magnetic gap forming portions of the magnetic cores can be made very small, and a stress maximizing the permeability can be left in the magnetic gap forming portions of the magnetic cores, thereby ensuring a superior reproduction efficiency of the magnetic head.

In the preferred mode where a fusing glass is used for bonding of the magnetic gap forming portions, and a fusing glass having a glass transition point lower than a flexure point of the fusing glass to be used for bonding of the magnetic gap forming portions is used as the nonmagnetic material to be filled in the vicinity of the magnetic gap, it is possible to prevent that the magnetic gap will be opened in filling the nonmagnetic material in the vicinity of the magnetic gap, thus ensuring a sufficient bonding strength in the magnetic ahead.

Further, in the preferred mode where the bonding of the magnetic gap forming portions is effected by thermal diffusion of a metal film at low temperatures, a sufficient bonding strength in the magnetic head can be ensured, and the manufacture of the magnetic head can be performed at low temperatures to thereby improve the productivity and accordingly increase the industrial value.

Further, in the preferred mode where the track width defining grooves are formed on each magnetic core substrate at a given pitch so as to leave a flat portion having a width at least three times a track width on each magnetic core substrate, the pressure to be applied to each magnetic core substrate upon bonding the substrates together can be reduced by the flat portion, thereby easily controlling a stress to the magnetic core substrates. As a result, the magnetic characteristics of the magnetic core substrates can be optimally controlled.

Other objects and features of the invention will be more fully understood from the following detailed description and appended claims when taken with the accompanying drawings.

BRIEF DESCRIPTION OF THE DRAWINGS

FIG. 1 is an illustration of a magnetic head used for the purpose of analysis relating to the relation between a permeability and a head efficiency;

FIG. 12 is a perspective view illustrating the first step of forming track width defining grooves on a substrate in a manufacturing method for a magnetic head according to a first preferred embodiment of the present invention;

DETAILED DESCRIPTION OF THE PREFERRED EMBODIMENTS

There will now be described some preferred embodiments of the present invention with reference to the drawings.

Figure 2:
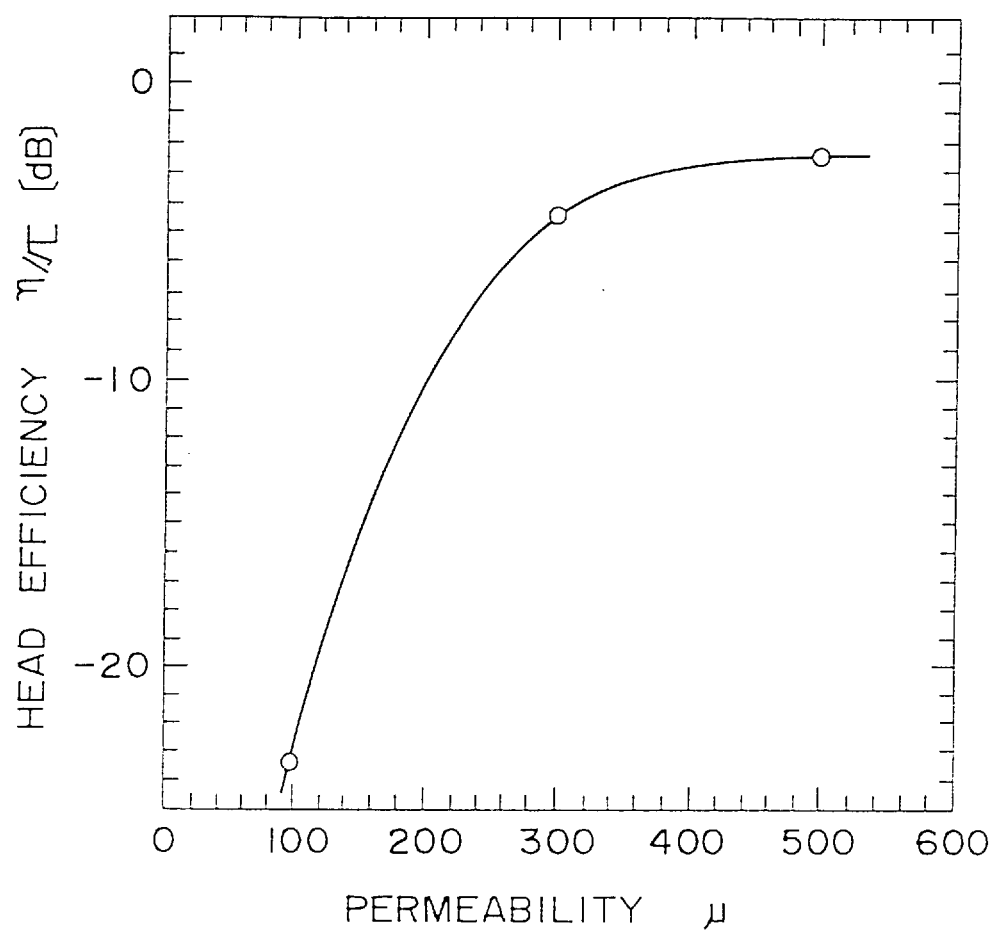
FIG. 2 is a characteristic graph showing the relation between the permeability and the head efficiency.
Figure 3A:
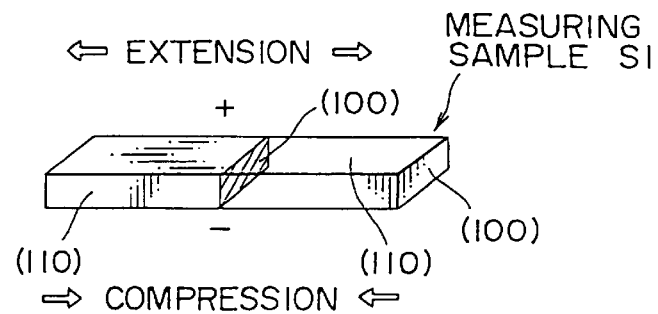
FIG. 3 is a characteristic graph showing the stress and frequency dependencies of a permeability of a monocrystal ferrite with an orientation <100> according with a tape sliding direction.
Figure 3B:
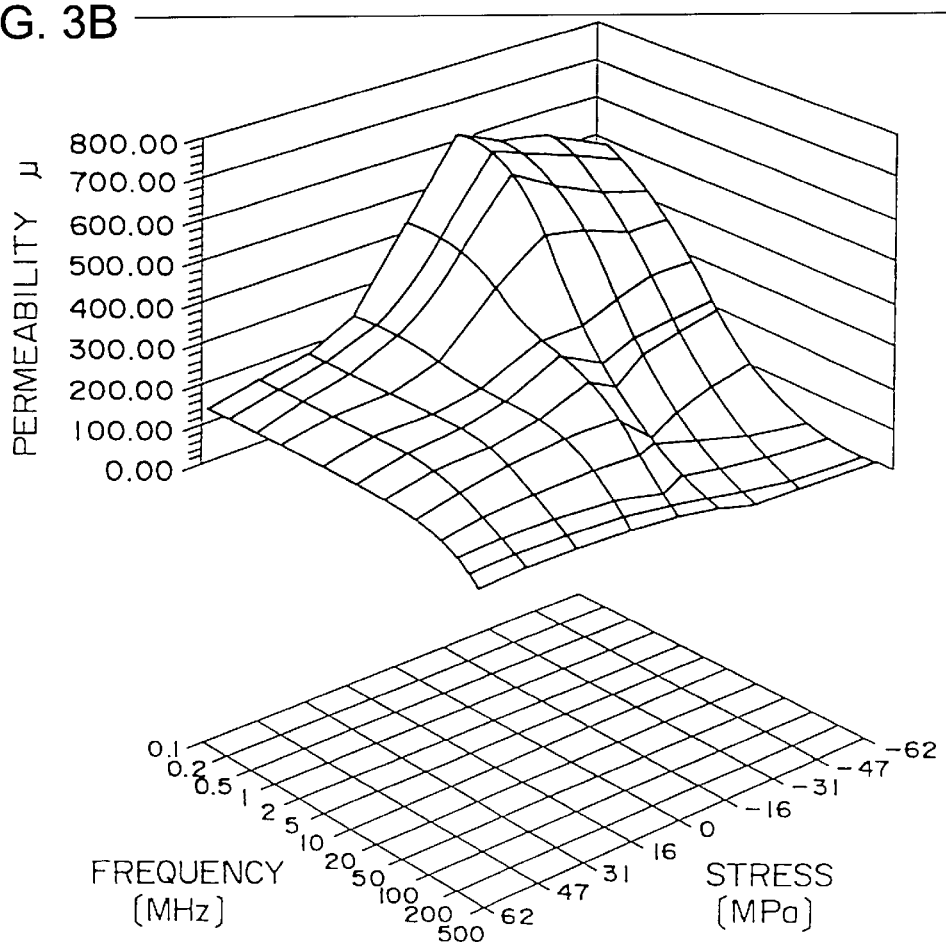
Figure 4A:
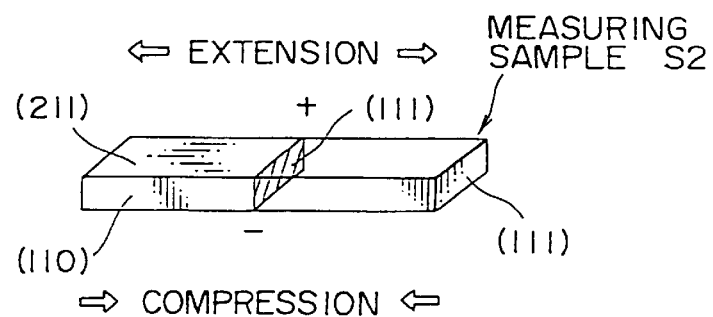
FIG. 4 is a characteristic graph showing the stress and frequency dependencies of a permeability of a monocrystal ferrite with an orientation <111> according with a tape sliding direction.
Figure 4B:
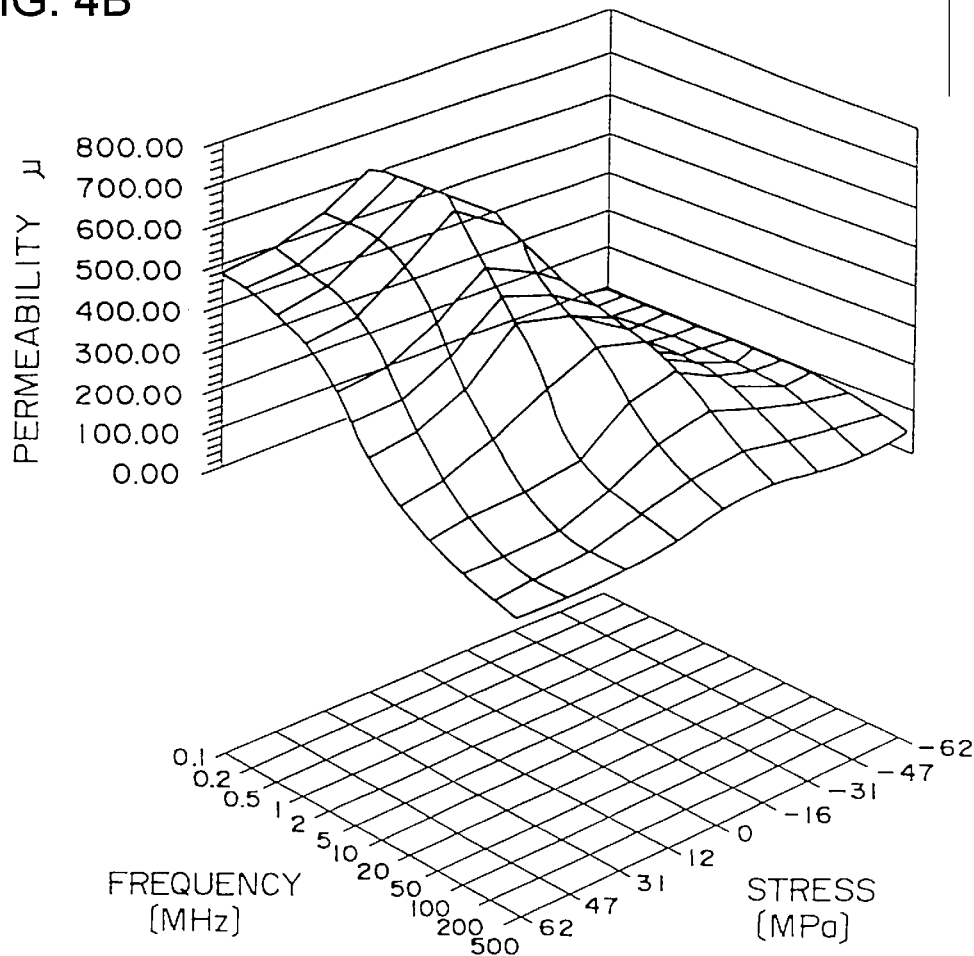
Figure 5A:
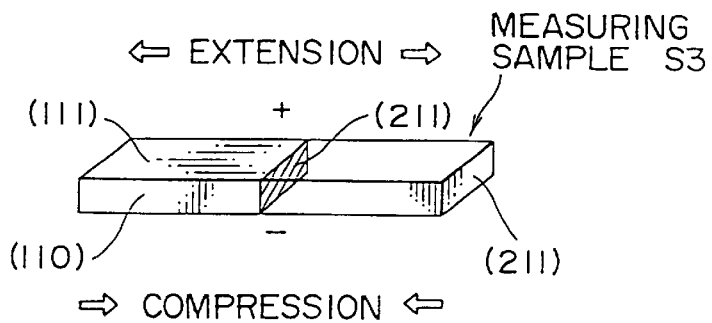
FIG. 5 is a characteristic graph showing the stress and frequency dependencies of a permeability of a monocrystal ferrite with an orientation <211> according with a tape sliding direction.
Figure 5B:
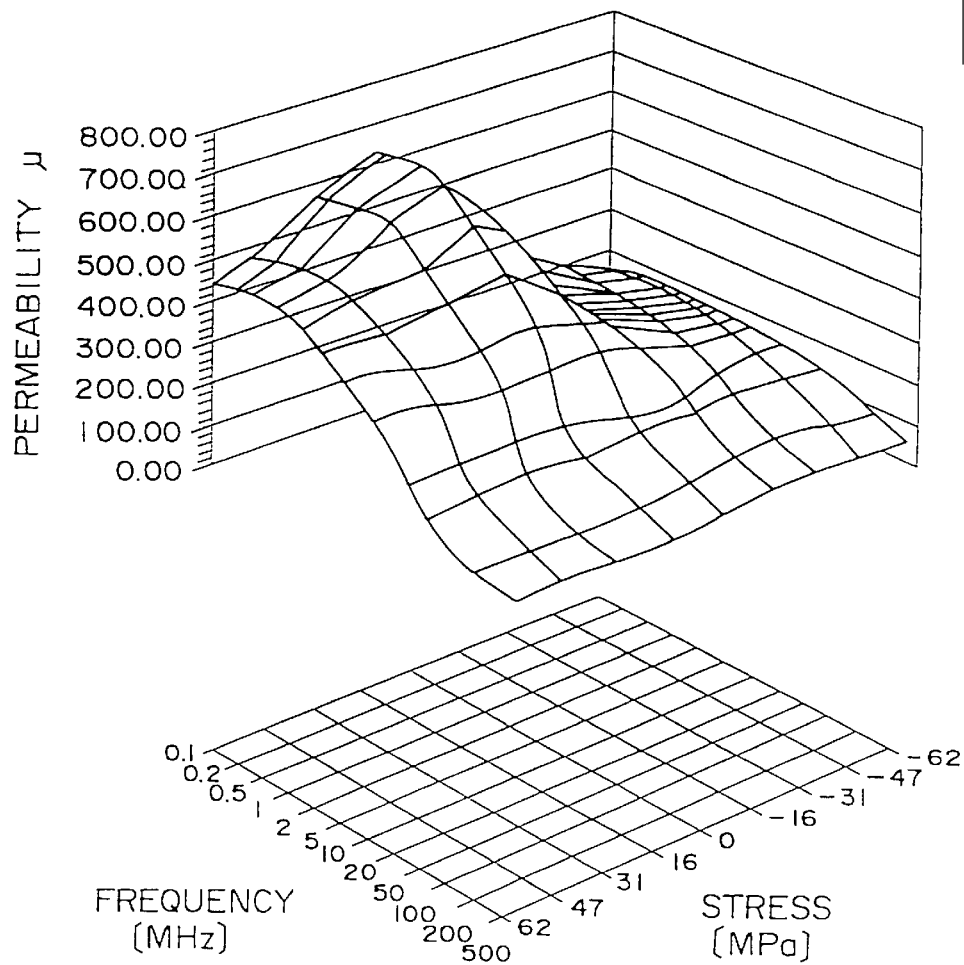
Figure 6:
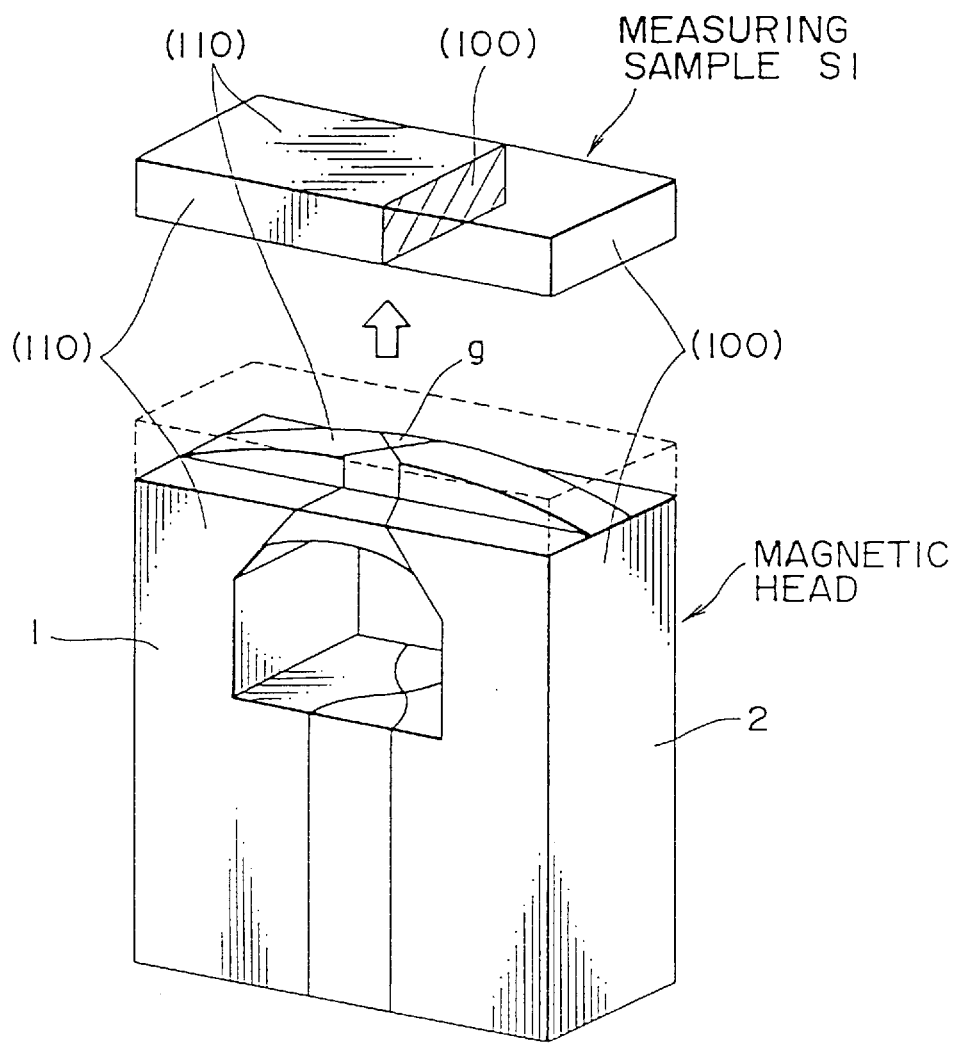
FIG. 6 is a perspective view illustrating the correspondence between a measuring sample shown in FIG. 3 and a magnetic head.
Figure 7:
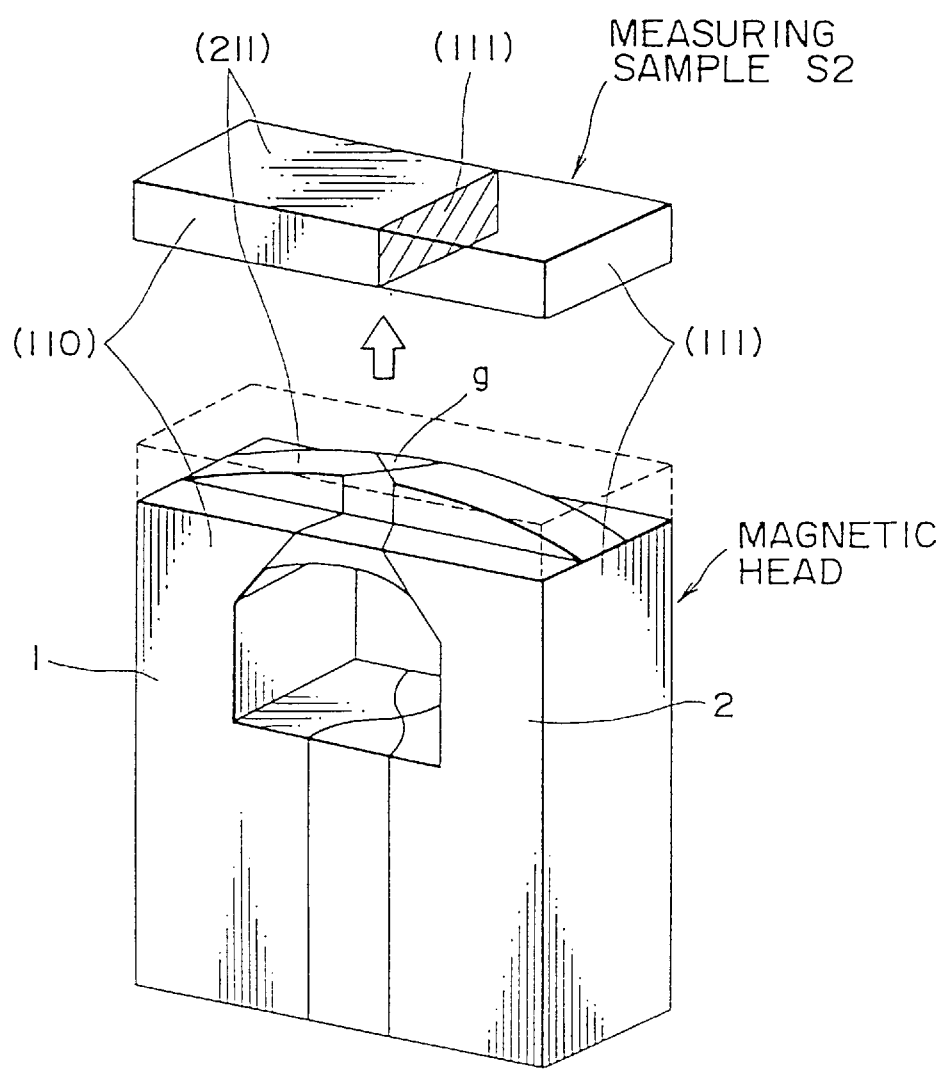
FIG. 7 is a perspective view illustrating the correspondence between a measuring sample shown in FIG. 4 and a magnetic head.
Figure 8:
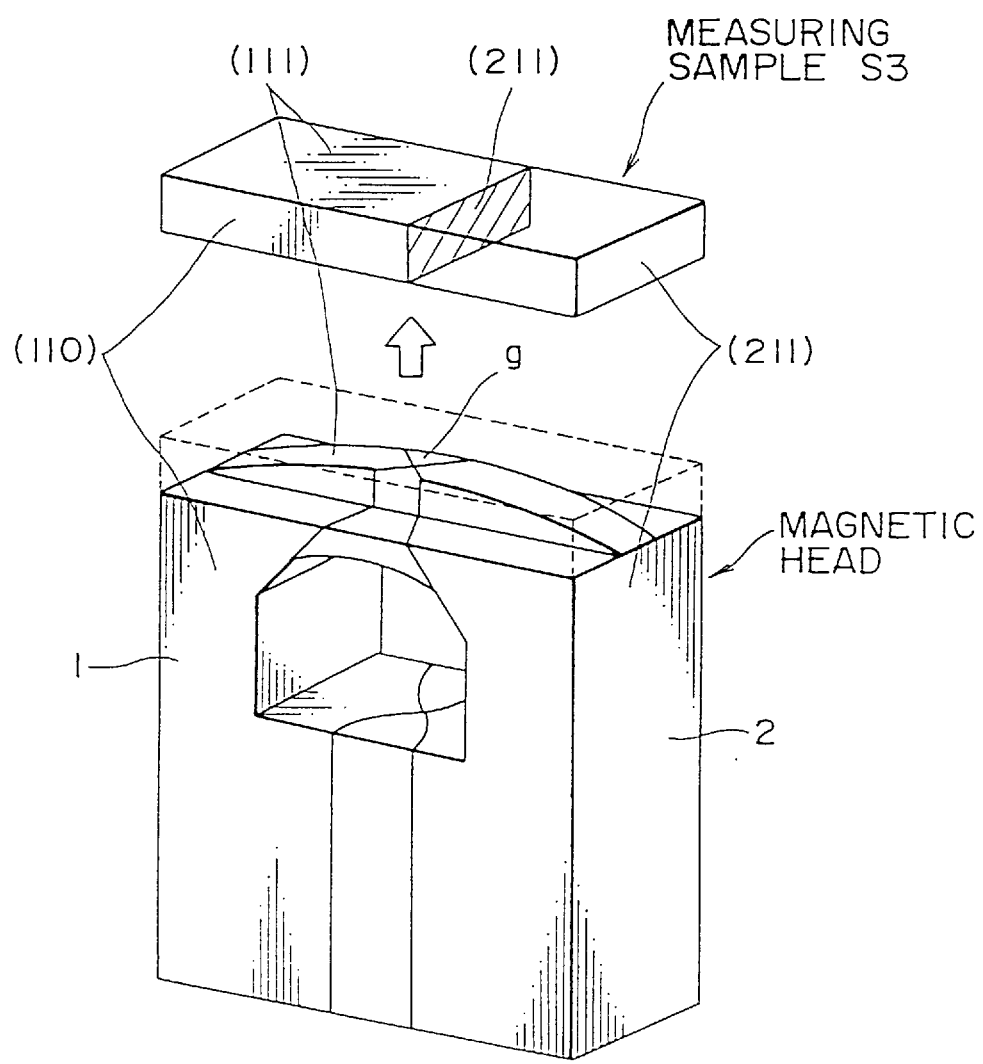
FIG. 8 is a perspective view illustrating the correspondence between a measuring sample shown in FIG. 5 and a magnetic head.
Figure 9:
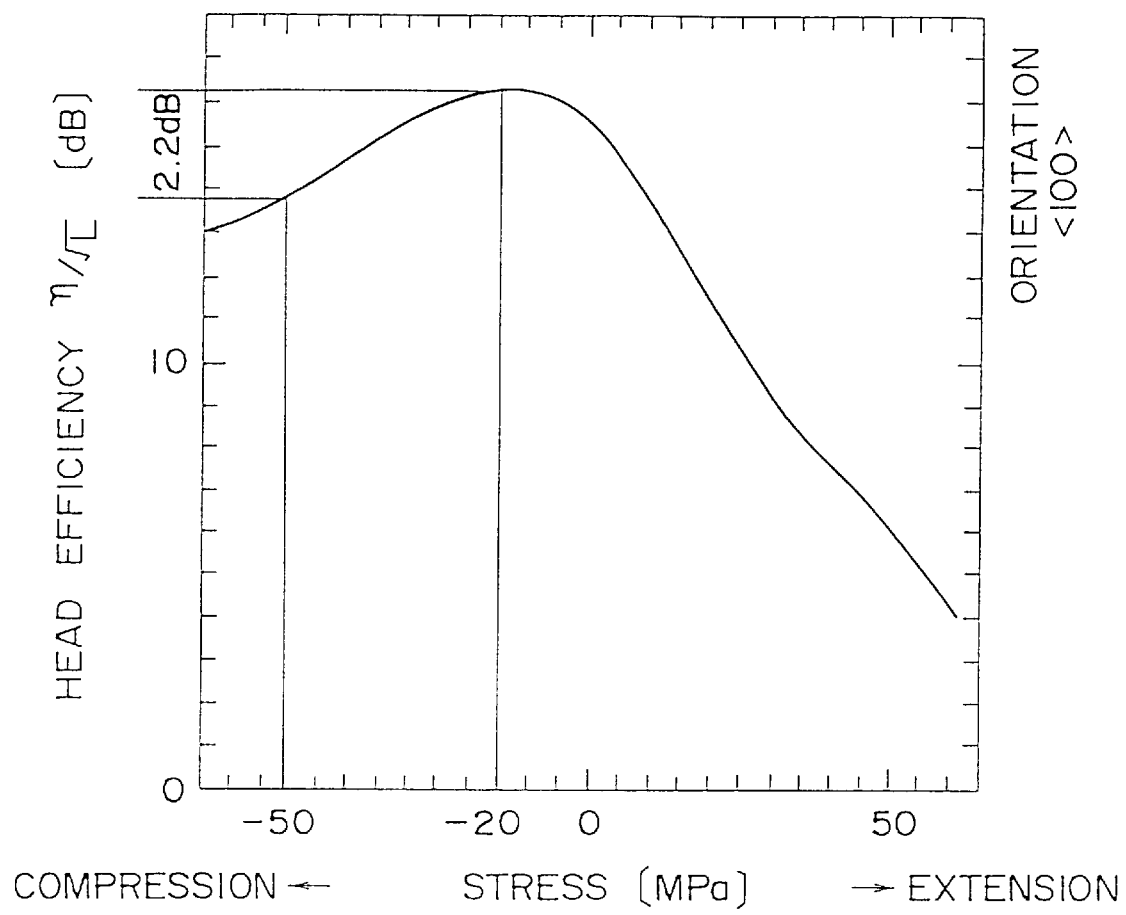
FIG. 9 is a characteristic graph showing the stress dependency of a head efficiency of a monocrystal ferrite head with an orientation <100> according with the tape sliding direction.
Figure 10:
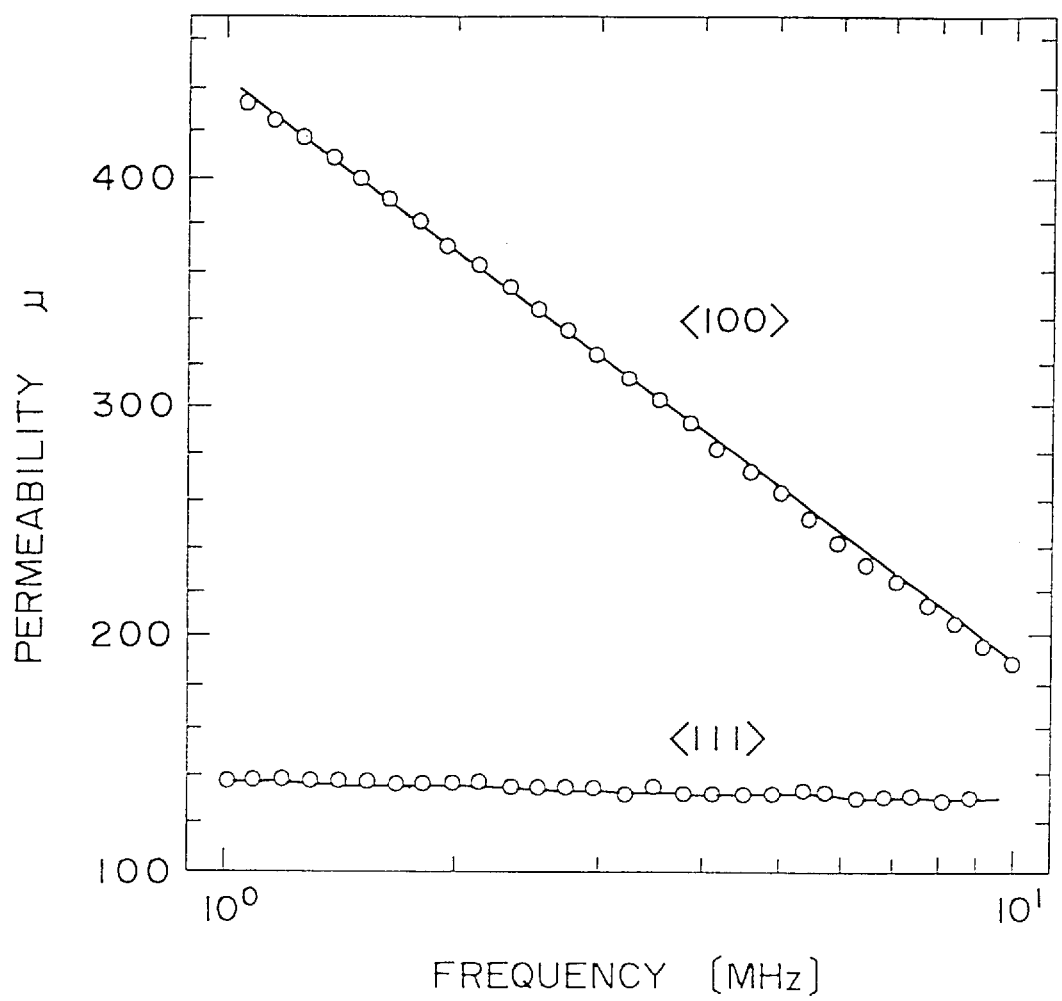
FIG. 10 is a characteristic graph showing the frequency dependency of a permeability of monocrystal ferrite heads with orientations <100> and <111> according with the tape sliding direction.
Figure 11:
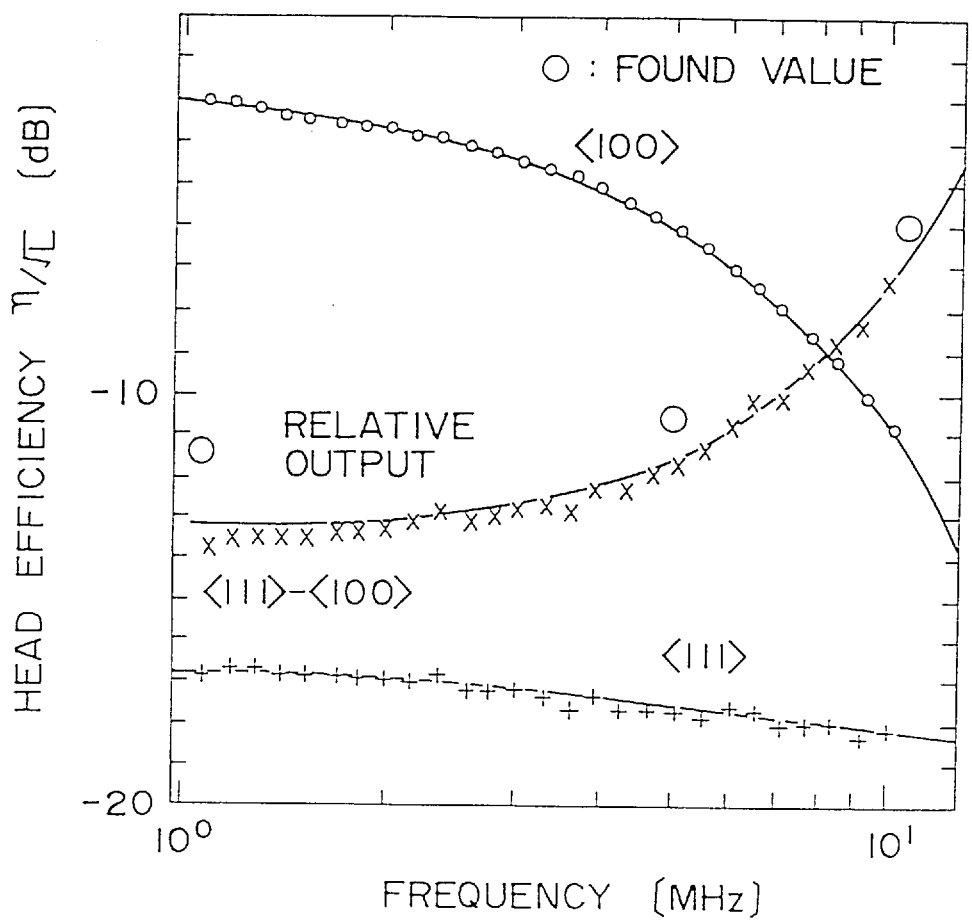
FIG. 11 is a characteristic graph showing the frequency dependency of a head efficiency of monocrystal ferrite heads with orientations <100> and <111> according with the tape sliding direction.

Using Mn—Zn monocrystal ferrite as a magnetic core material, the present inventors investigated the relation between an internal residual stress in the material and a permeability of the material. Typical examples of the Mn—Zn monocrystal ferrite may include so-called β-ferrite having face orientations as shown in FIG. 6 and so-called J-ferrite having face orientations as shown in FIG. 7. The face orientations of the β-ferrite and the J-ferrite are shown in Table 1.

TABLE 1

|   | Gap forming surface | Sliding surface | Chip side surface |
|---|---|---|---|
| β | (100) | (110) | (110) |
| J | (111) | (211) | (110) |

Figure 18:
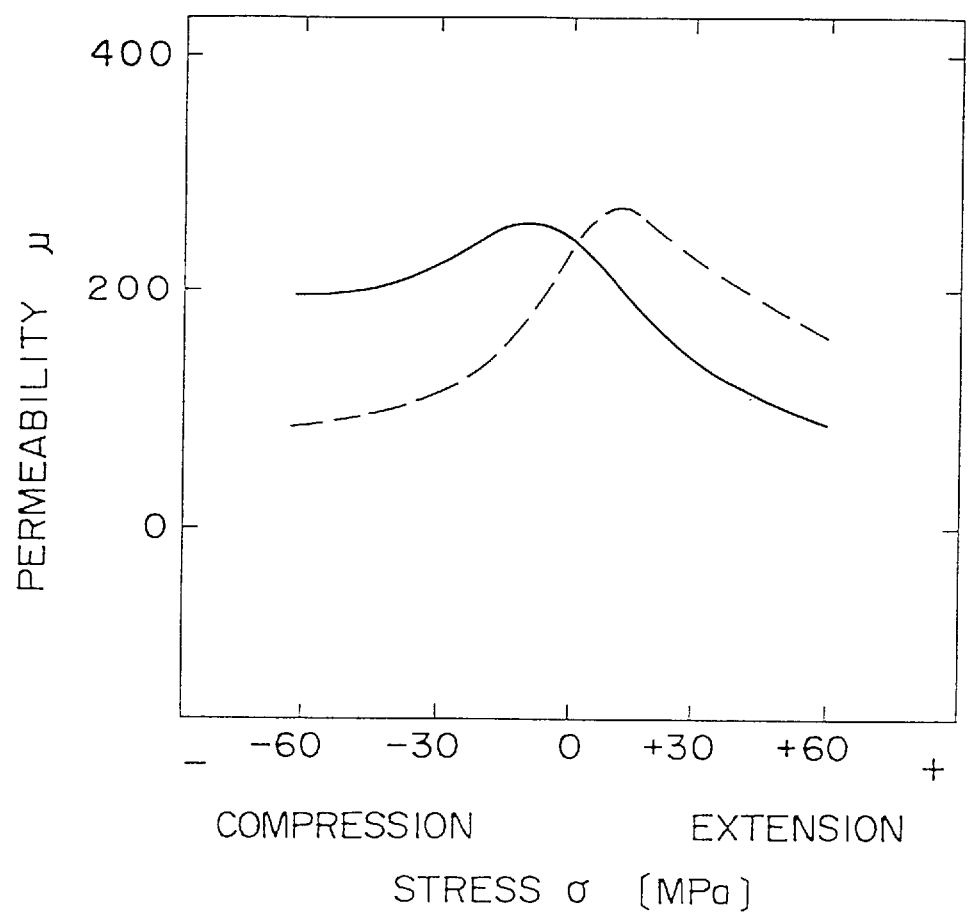
FIG. 18 is a characteristic graph showing the relation between a stress and a permeability in Mn—Zn monocrystal β-ferrite and Mn—Zn monocrystal J-ferrite.

Using the β-ferrite and the J-ferrite, the present inventors measured a permeability of the β-ferrite by applying a stress thereto in a direction perpendicular to the gap forming surface of the β-ferrite, that is, in the direction <100>, and also measured a permeability of the J-ferrite by applying a stress thereto in a direction perpendicular to the gap forming surface of the J-ferrite, that is, in the direction <111>. The results of measurement are shown in FIG. 18, wherein the relation between the permeability of the β-ferrite and the stress applied is shown by a solid line, and the relation between the permeability of the J-ferrite and the stress applied is shown by a broken line. As apparent from FIG. 18, the permeability in each case is dependent upon the stress applied. That is, the permeability tends to decrease with an increase in absolute value of the stress applied.

The stress dependency of the permeability of the Mn—Zn monocrystal ferrite may be explained as follows:

In general, the Mn—Zn monocrystal ferrite forming the magnetic cores has a relatively large magnetostriction constant of about $10^{-6}$. Therefore, apparent magnetic anisotropy changes with an internal residual stress remaining in the ferrite after applying a pressure thereto.

In general, an apparent anisotropic energy K is expressed as follows:

$$K = K1 - (3/2)\lambda_{abc} \cdot \sigma_{abc} \quad (1)$$

where K1 represents magnetic anisotropy; $\lambda_{abc}$ represents a magnetostriction constant in a direction <abc> perpendicular to the gap forming surface; and $\sigma_{abc}$ represents a stress in the direction <abc>.

In general, the relation between a permeability $\mu$ and an anisotropic energy K in a frequency region dominated by a rotating magnetization stage is expressed as follows:

$$\mu \alpha 1/K \quad (2)$$

That is, the permeability $\mu$ is in reverse proportion to the anisotropic energy K.

In the Mn—Zn monocrystal ferrite used for the measurement of the permeability, the magnetic anisotropy K1 is positive, and the magnetostriction constant $\lambda_{100}$ in the direction <100> is negative. Assuming that the stress in the direction of extension is positive, it is understood from Expression (1) that when the stress $\sigma_{100}$ in the direction <100> increases in the direction of extension (i.e., in the positive direction), the anisotropic energy K in the direction <100> increases with the increase in the stress $\sigma_{100}$. Accordingly, it is understood from Expression (2) that the permeability $\mu$ decreases with the increase in the anisotropic energy K. Further, it is understood from Expression (1) that when the stress $\sigma_{100}$ increases in the direction of compression (i.e., in the negative direction), the anisotropic energy K decreases until the stress $\sigma_{100}$ reaches a certain value, then inverting the sign to start increasing. Accordingly, it is understood from Expression (2) that when the stress $\sigma_{100}$ increases in the direction of compression, the permeability $\mu$ increases to a certain value and then decreases. These results agree with the relation between the change in the permeability of the β-ferrite and the change in the stress in the direction <100> as shown by the solid line in FIG. 18.

On the other hand, the magnetostriction constant $\lambda_{111}$ in the direction <111> is positive. Assuming that the stress in the direction of extension is positive, it is understood from Expression (1) that when the stress $\sigma_{111}$ in the direction <111> increases in the direction of extension (i.e., in the positive direction), the anisotropic energy K in the direction <111> decreases until the stress $\sigma_{111}$ reaches a certain value, then inverting the sign to start increasing. Accordingly, it is understood from Expression (2) that when the stress $\sigma_{111}$ increases in the direction of extension, the permeability $\mu$ increases to a certain value and then decreases. Further, it is understood from Expression (1) that when the stress $\sigma_{111}$ increases in the direction of compression (i.e., in the negative direction), the anisotropic energy K in the direction <111> increases with the increase in the stress $\sigma_{111}$. Accordingly, it is understood from Expression (2) that the permeability $\mu$ decreases with the increase in the anisotropic energy K. These results agree with the relation between the change in the permeability of the J-ferrite and the change in the stress in the direction <111> as shown by the broken line in FIG. 18.

The present inventors prepared two kinds of magnetic heads using the β-ferrite and the J-ferrite having the face orientations shown in Table 1 by the conventional manufacturing method, and evaluated the reproduction efficiencies of these magnetic heads. As the result, it was confirmed that the reproduction efficiency of the magnetic head using the β-ferrite having the face orientation (100) as the gap forming surface is higher by 10 dB than the reproduction efficiency of the magnetic head using the J-ferrite having the face orientation (111) as the gap forming surface. This result indicates that the permeability of the β-ferrite is higher than that of the J-ferrite. Further, this result agrees with the relation in permeability between the β-ferrite and the J-ferrite shown in FIG. 18 in the case where the stress in the direction perpendicular to the gap forming surface is applied in the direction of compression, and it was confirmed that the stress in the direction perpendicular to the gap forming surface remains in each magnetic head.

Now, a first preferred embodiment of the manufacturing method for the magnetic head according to the present invention will be described with reference to FIGS. 12 to 17.

First, a substrate 3 formed of ferrite as shown in FIG. 12 is prepared, so as to form a pair of magnetic cores. Then, a plurality of track width defining grooves 4 for defining a track width of each magnetic core are formed on an upper surface of the substrate 3 so as to be arranged at a given pitch in a lateral direction of the substrate 3 and extend in a longitudinal direction of the substrate 3. Each track width defining groove 4 has a substantially semi-circular cross section.

Figure 13:
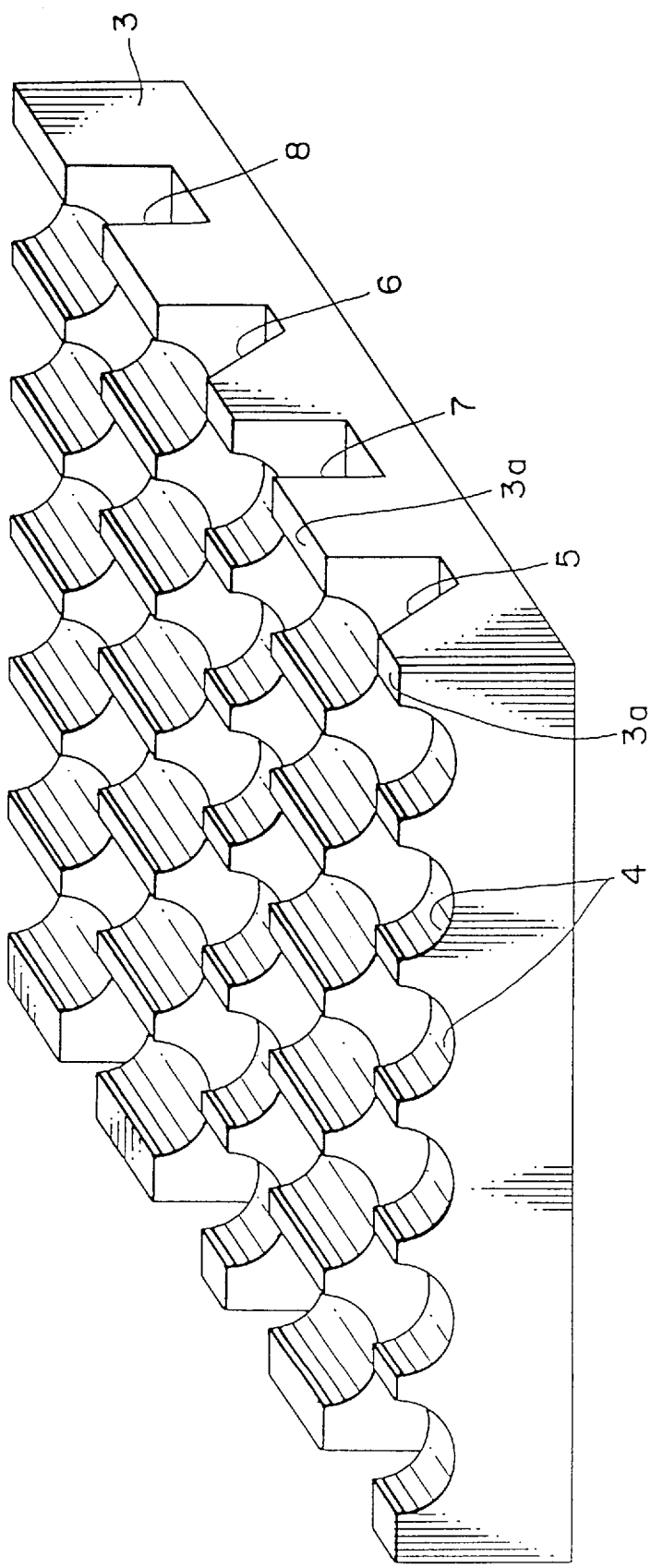
FIG. 13 is a perspective view illustrating the second step of forming coil grooves and glass grooves on the substrate after the first step shown in FIG. 12.

Then, as shown in FIG. 13, coil grooves 5 and 6 for receiving coils and glass grooves 7 and 8 for receiving glass are formed on the upper surface of the substrate 3 so as to be arranged at a given pitch in the longitudinal direction of the substrate 3 and extend in the lateral direction of the substrate 3. Each of the coil grooves 5 and 6 has a substantially trapezoidal cross section, and each of the glass grooves 7 and 8 has a substantially U-shaped cross section. Thus, the coil grooves 5 and 6 and the glass grooves 7 and 8 extend in orthogonal relationship to the track width defining grooves 4 on the upper surface of the substrate 3. Then, a plurality of gap forming surfaces 3a formed as a residual portion of the upper surface of the substrate 3 are mirror-finished.

Each of the coil grooves 5 and 6 is formed at a position such that a front gap depth will become zero, and each of the glass grooves 7 and 8 is formed at a position such that a backgap depth will become a given value.

Figure 14:
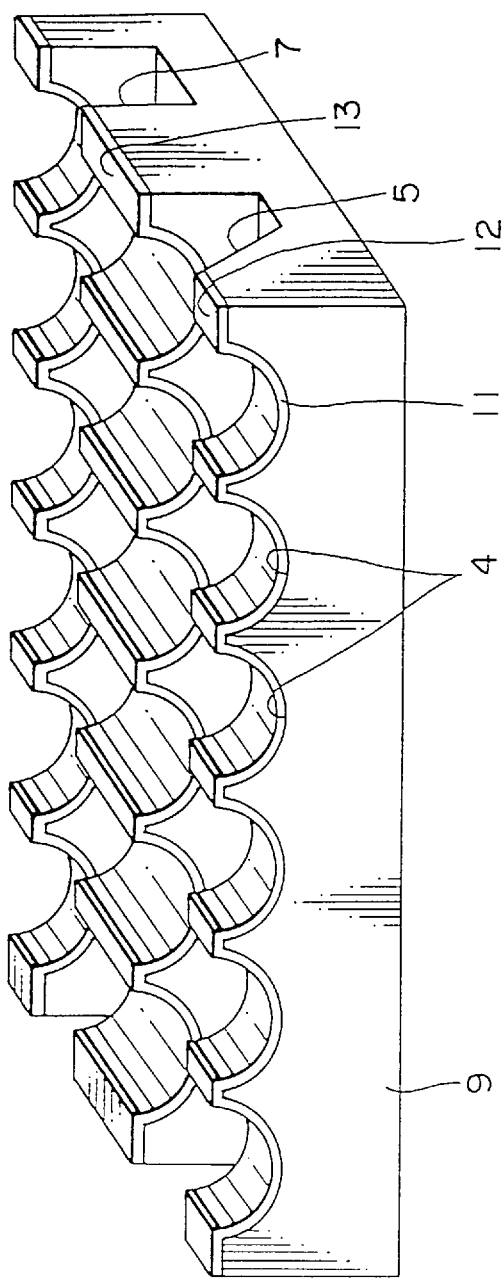
FIG. 14 is a perspective view illustrating the third step of dividing the substrate into a pair of blocks and forming a gap film on each block after the second step shown in FIG. 13.
Figure 15:
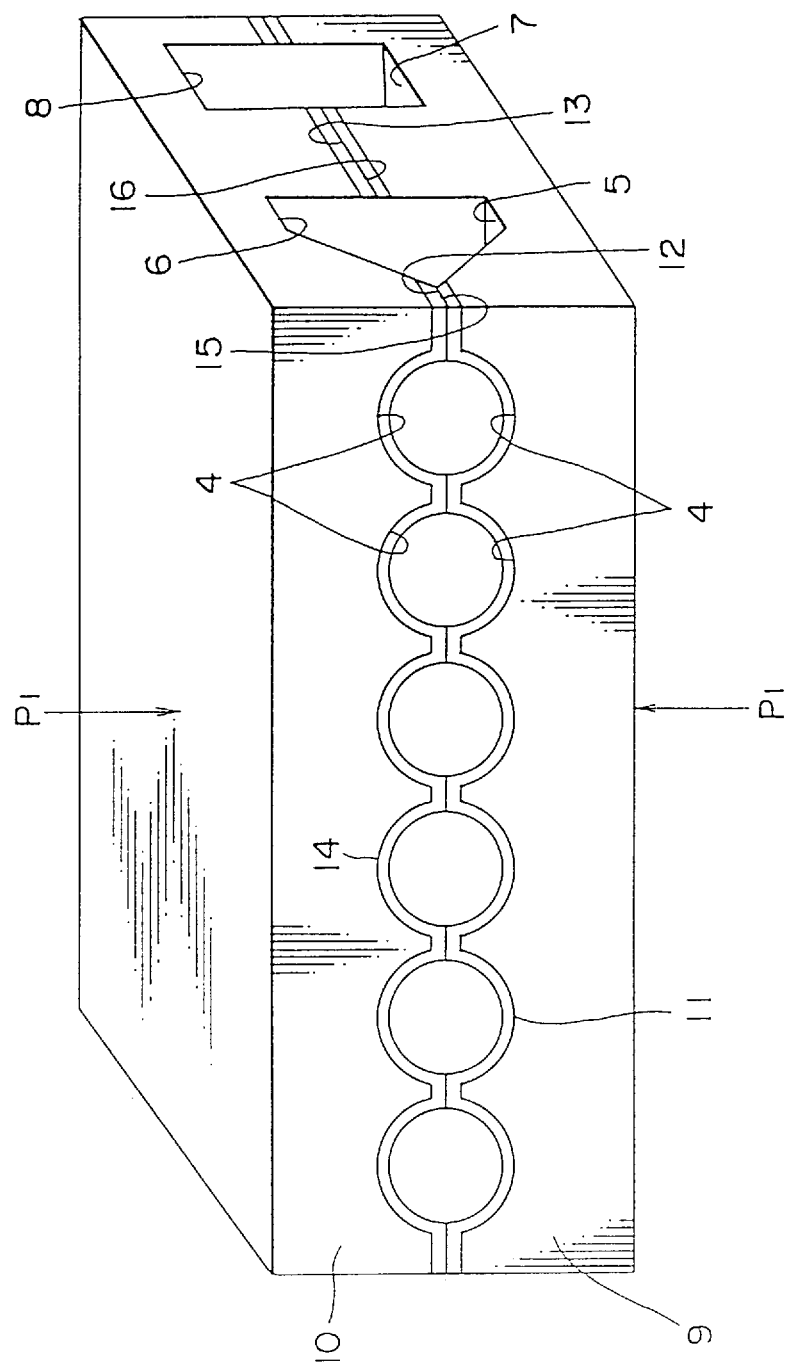
FIG. 15 is a perspective view illustrating the fourth step of bonding the pair of blocks together through the gap films after the third step shown in FIG. 14.

Then, the substrate 3 is divided into a block 9 having the coil groove 5 and the glass groove 7 as shown in FIG. 14 and a block 10 having the coil groove 6 and the glass groove 8 as shown in FIG. 15.

Then, as shown in FIG. 14, a gap film 11 formed of a fusing glass is formed on the upper surface of the block 9 except the inner surfaces of the coil grooves 5 and the glass grooves 7 so as to have a thickness about half a gap length of the magnetic head by using a suitable thin film forming technique such as a magnetron sputtering process, thus forming a plurality of front gap forming surfaces 12 and a plurality of back gap forming surfaces 13. Similarly, a gap film 14 is formed on the upper surface of the block 10 to form a plurality of front gap forming surfaces 15 and a plurality of back gap forming surfaces 16 (see FIG. 15).

Then, as shown in FIG. 15, both the blocks 9 and 10 are matched with each other so that the front gap forming surfaces 12 and 15 face each other and the back gap forming surfaces 13 and 16 face each other. Then, a pressure is applied to the blocks 9 and 10 in opposite directions depicted by arrows P1 in FIG. 15 in the presence of heat under predetermined conditions.

As a result, the front gap forming surfaces 12 and 15 of the blocks 9 and 10 are bonded together through the gap films 11 and 14, and the back gap forming surfaces 13 and 16 of the blocks 9 and 10 are also bonded together through the gap films 11 and 14. Thus, both the blocks 9 and 10 are bonded together at the gap forming portions only.

Figure 16:
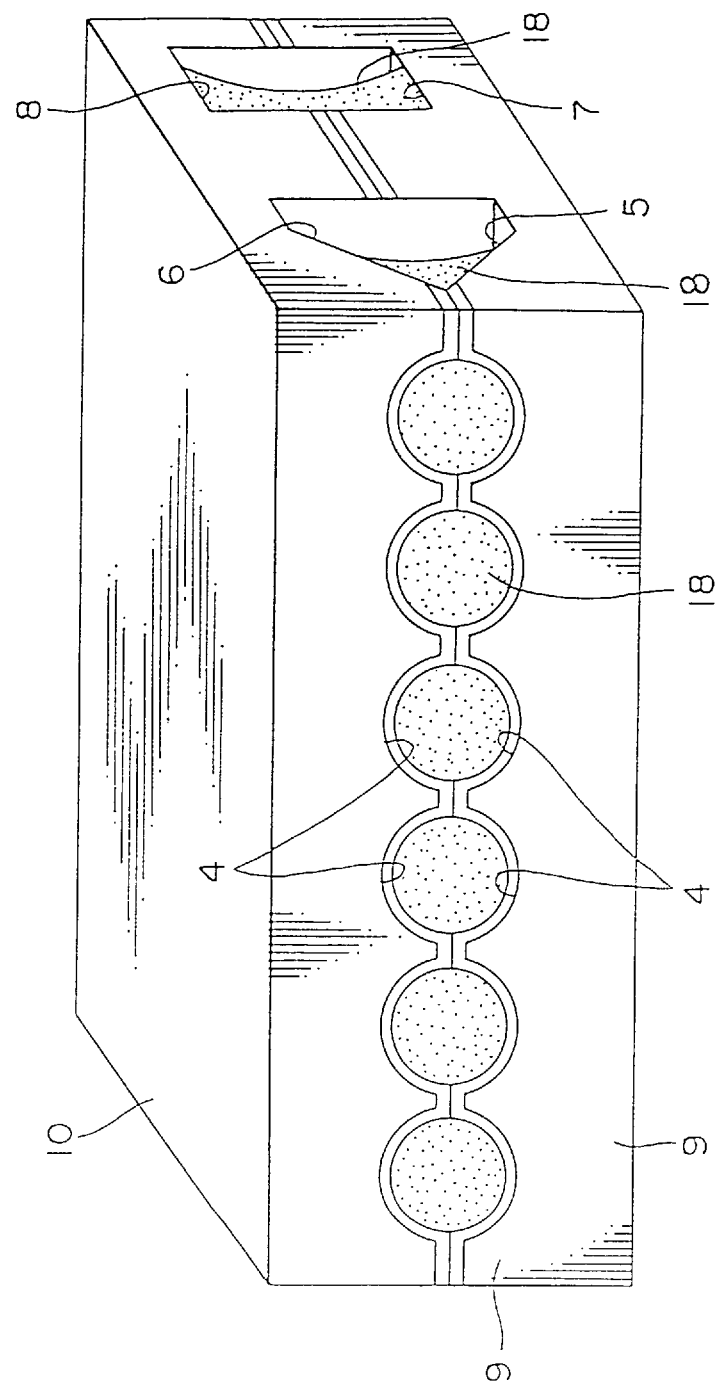
FIG. 16 is a perspective view illustrating the fifth step of filling a nonmagnetic material in the track width defining grooves and in the vicinity of magnetic gaps after the fourth step shown in FIG. 15.

Then, as shown in FIG. 16, glass rods formed of a fusing glass are inserted into a space defined by the coil grooves 5 and 6 and a space defined by the glass grooves 7 and 8, and the glass rods are then fused at a given temperature to be filled as a fusing glass 18 in the vicinity of a plurality of front gaps defined between the front gap forming surfaces 12 and 15, in the vicinity of a plurality of back gaps defined between the back gap forming surfaces 13 and 16, and in a plurality of spaces defined by the track width defining grooves 4. Then, a tape sliding surface 19 of such an integrated body of the blocks 9 and 10 is subjected to cylindrical grinding, and the integrated body is then cut into chips as the magnetic cores. Thereafter, coils are located in the coil grooves 5 and 6 of each chip, thereby obtaining the magnetic head as shown in FIG. 17.

Figure 17:
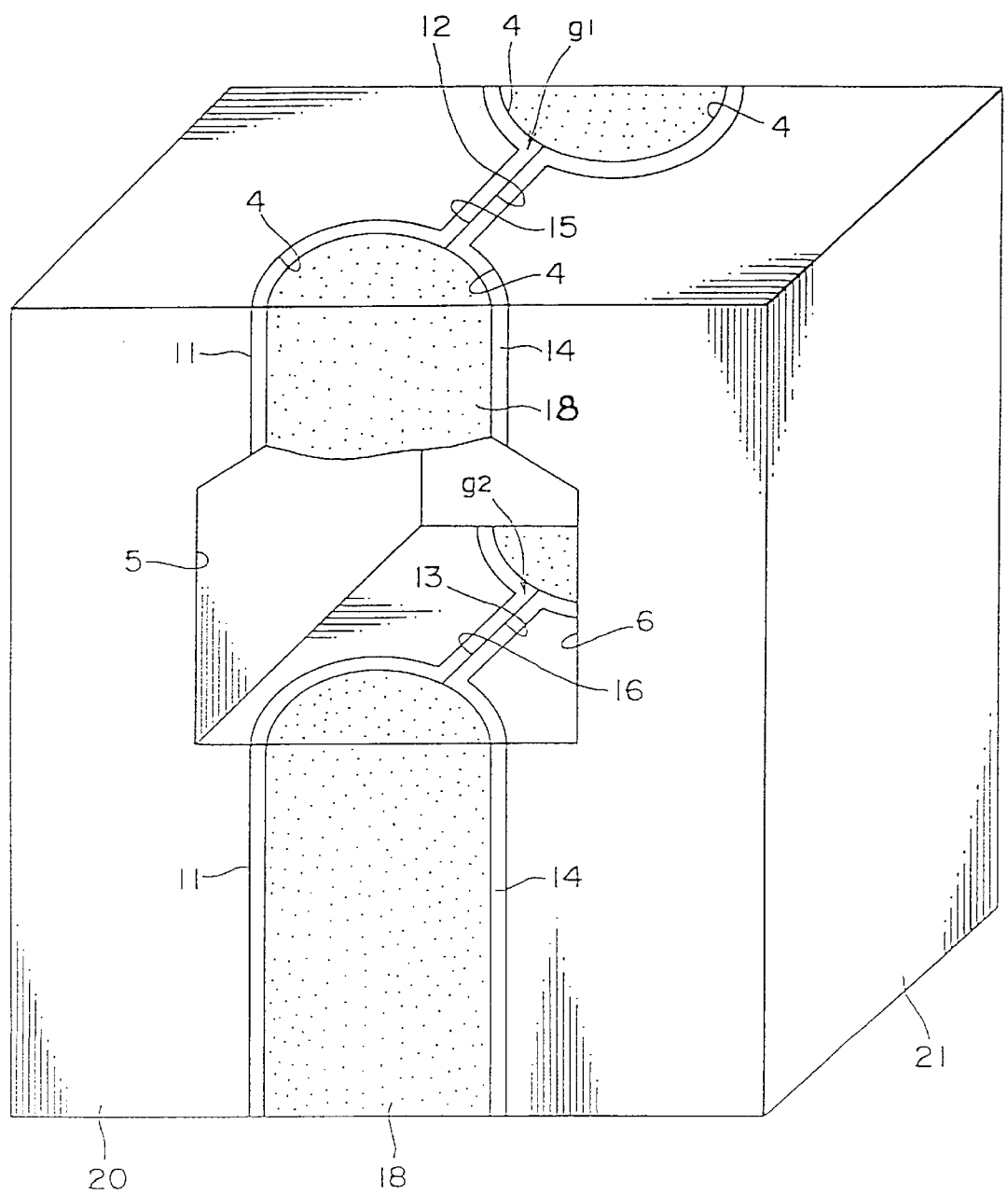
FIG. 17 is a perspective view of a magnetic head obtained after the fifth step shown in FIG. 16.

As shown in FIG. 17, a pair of magnetic cores 20 and 21 are bonded to each other so that the front gap forming surfaces 12 and 15 face each other to define a front gap $g_1$ therebetween and the back gap forming surfaces 13 and 16 face each other to define a back gap $g_2$ therebetween. Further, the fusing glass 18 as the nonmagnetic material is filled in the track width defining grooves 4 and in the vicinity of the front gap $g_1$ and the back gap $g_2$. Further, the coil grooves 5 and 6 for receiving the coils are formed on the opposed surfaces of the magnetic cores 20 and 21 so as to be opposed to each other.

Some examples of the manufacturing method mentioned above will now be described.

(EXAMPLE 1)

A substrate formed of Mn—Zn monocrystal β-ferrite was prepared, and a plurality of track width defining grooves were formed on the (100) surface of the substrate as a gap forming surface so that a track width may become 20 μm. Then, a plurality of coil grooves and glass grooves were formed on the (100) surface of the substrate so as to cross the track width defining grooves. Then, the substrate was divided into a pair of blocks each having every unit of the coil groove and the glass groove.

Then, a gap film having a thickness (e.g., 1000 angstroms) half a gap length was formed on each block under the conditions of a gas pressure of 0.8 Pa and a power density of 1 W/cm², thus forming front gap forming surfaces and back gap forming surfaces. A fusing glass mainly composed of $SiO_2$ and having a flexure point of 583° C. and a glass transition point of 638° C. was used as the material of the gap film.

Then, both the blocks were matched with each other so that the front gap forming surfaces of both the blocks faced each other and the back gap forming surfaces faced each other. In this conditions heat and pressure were applied to the blocks at 640° C. under tens of MPa for one hour. Then, Pb glass rods as a fusing glass having a glass transition point (560° C.) lower than the flexure point of the fusing glass used for the gap film were located in the coil grooves and the glass grooves formed on the opposed surfaces of the blocks, and the Pb glass rods were heated at 560° C. for one hour to be fused and filled in the vicinity of the magnetic gaps and in the track width defining grooves.

At this time, the fusing glass forming the gap film was not fused again, so that the magnetic gaps were not opened. Then, a tape sliding surface of an integrated body of both the blocks was subjected to cylindrical grinding, and the integrated body was then cut into chips. Thereafter, coils were located in the coil grooves of each chip to obtain a magnetic head employing the Mn—Zn monocrystal β-ferrite as the magnetic cores.

(EXAMPLE 2)

A substrate formed of Mn—Zn monocrystal J-ferrite was prepared, and a plurality of track width forming grooves were formed on the (111) surface of the substrate in the same manner as that in Example 1. Thereafter, the same process as that in Example 1 was carried out to obtain a magnetic head employing the Mn—Zn monocrystal J-ferrite as the magnetic cores.

(Comparison 1)

For the purpose of comparisons a magnetic head employing the Mn—Zn monocrystal β-ferrite as the magnetic cores was made by the conventional manufacturing method as mentioned previously. That is, a plurality of track width defining grooves, coil grooves and glass grooves were formed on a substrate formed of Mn—Zn monocrystal β-ferrite to prepare a pair of blocks. Then, a gap film of SiO$_2$ was formed on each block to form gap forming surfaces, and both the blocks were matched with each other so that the gap forming surfaces of both the blocks faced each other. Then, Pb glass rods as a fusing glass having a glass transition point of 560° C. were located in the coil grooves and the glass grooves of the blocks, and heat and pressure were applied to the blocks at 560° C. under tens of MPa for one hour to fuse the Pb glass rods and fill the same in the vicinity of the magnetic gaps and in the track width defining grooves. Then, a tape sliding surface of an integrated body of both the blocks was subjected to cylindrical grinding, and the integrated body was then cut into chips. Thereafter, coils were located in the coil grooves of each chip to obtain a magnetic head employing the Mn—Zn monocrystal β-ferrite as the magnetic cores.

(Comparison 2)

Using Mn—Zn monocrystal J-ferrite rather than Mn—Zn monocrystal β-ferrite as the material of the magnetic cores, a magnetic head was made by the same method as that in Comparison 1.

The electromagnetic conversion characteristics of the magnetic heads obtained in Examples 1 and 2 and Comparisons 1 and 2 were evaluated. Comparing a reproduction output of the magnetic head employing the β-ferrite in Example 1 with that of the magnetic head employing the β-ferrite in Comparison 1, it was confirmed that the reproduction output in Example 1 was higher by 2 dB than that in Comparison 1. This result is considered to be due to the fact that the internal residual stress in the magnetic cores in Example 1 was reduced more greatly than that in Comparison 1 to improve the permeability of the magnetic cores. Further, comparing a reproduction output of the magnetic head employing the J-ferrite in Example 2 with that of the magnetic head employing the J-ferrite in Comparison 2, it was confirmed that the reproduction output in Example 2 was higher by 10 dB than that in Comparison 2. This result is similarly considered to be due to the fact that the internal residual stress in the magnetic cores in Example 2 was reduced more greatly than that in Comparison 2 to improve the permeability of the magnetic cores.

In the above examples, Mn—Zn monocrystal ferrite is used as the magnetic material for forming the magnetic cores. However, the magnetic cores may be formed of combined monocrystal ferrite and polycrystal ferrite so that a front end portion only of each magnetic core forming the front gap is formed of the monocrystal ferrite and the other portion is formed of the polycrystal ferrite.

Further, in the above examples, the gap film is formed as a single-layer film of fusing glass. However, the gap film may be formed as a double-layer film consisting of an SiO$_2$ film as a base layer and a fusing glass film formed on the base layer. For example, the double-layer film may be obtained by forming the SiO$_2$ film having a thickness of 600 angstroms and then forming the fusing glass film having a thickness of 400 angstroms by a suitable thin film forming method such as magnetron sputtering.

Further, the gap film may be formed as a composite film consisting of a Cr film as a base layer and an Au film formed on the base layer. For example, the composite film may be obtained by forming the Cr film having a thickness of 600 angstroms and then forming the Au film having a thickness of 400 angstroms by a suitable thin film forming method such as sputtering. In this case, the bonding of the gap films formed on the pair of blocks may be carried out at 200° to 300° C. under tens of MPa. The Cr film as the base layer may be replaced by an SiO$_2$ film as required.

According to the manufacturing method in the above preferred embodiment, the magnetic gap forming portions of both the blocks are first bonded together, and the fusing glass is then filled in the vicinity of the magnetic gaps without applying a pressure to the blocks. Therefore, the internal stress remaining in the magnetic cores during the manufacture can be greatly reduced, so that no strain is generated in the magnetic gap forming portions of the magnetic cores to thereby improve the permeability of the magnetic cores. As a result, the reproduction efficiency of the magnetic head to be obtained can be improved. Further, the glass transition point of the fusing glass to be filled in the vicinity of the magnetic gaps is lower than the flexure point of the fusing glass to be used for the bonding of the magnetic gap forming portions. Therefore, even when the filling of the fusing glass in the vicinity of the magnetic gaps is carried out after the bonding of the magnetic gap forming portions, there is no possibility of the magnetic gaps opening, thus ensuring a sufficient bonding strength of the magnetic head.

A second preferred embodiment of the manufacturing method according to the present invention will now be described with reference to FIGS. 19 to 24.

Figure 19:
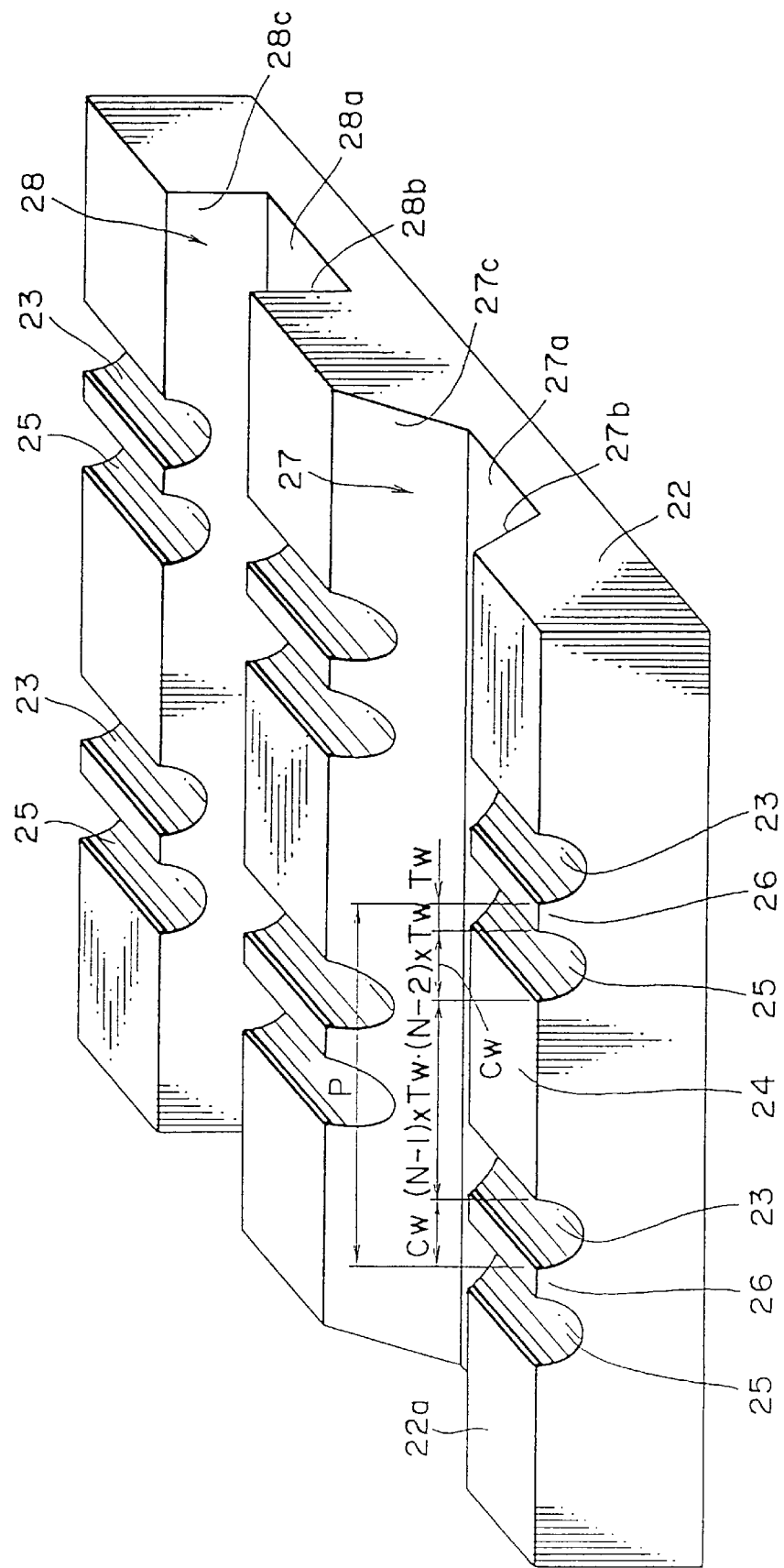
FIG. 19 is a perspective view illustrating the first step of forming track width defining grooves, a coil groove and a glass groove on a substrate in a manufacturing method for a magnetic head according to a second preferred embodiment of the present invention.

Referring to FIG. 19, a plate-like magnetic core substrate 22 formed of an oxide magnetic material such as Mn—Zn monocrystal ferrite or Ni—Zn monocrystal ferrite is prepared, and an upper surface 22a of the substrate 22 to be formed into a magnetic gap forming surface is mirror-finished. Then, a plurality of track width defining grooves 23 (according to the number of magnetic heads to be manufactured; two in this preferred embodiment) are formed on the upper surface 22a of the substrate 22 so as to be arranged at a given pitch P in a lateral direction of the substrate 22 and extend in a longitudinal direction of the substrate 22. Each of the track width defining grooves 23 has a substantially arcuate cross section.

More specifically, the track width defining grooves 23 are formed on the upper surface 22a of the substrate 22 in such a manner that a flat portion 24 having a width at least three times a track width Tw of a magnetic gap g (see FIG. 21) is left in one pitch P on the upper surface 22a.

Then, a plurality of track width defining grooves 25 are similarly formed on the upper surface 22a of the substrate 22 so as to be arranged at a given pitch in adjacent relationship to the track width defining grooves 23 in the lateral direction of the substrate 22 and extend in the longitudinal direction of the substrate 22. Each of the track width defining grooves 25 also has a substantially arcuate cross section.

Accordingly, a magnetic gap forming portion 26 having the track width Tw is formed between the track width defining grooves 23 and 25 adjacent to each other.

Then, a coil groove 27 for receiving a coil and a glass groove 28 for receiving a glass rod are formed on the upper surface 22a of the substrate 22 so as to cross the track width defining grooves 23 and 25.

More specifically, the coil groove 27 has a substantially trapezoidal cross section such that it is formed by a bottom surface 27a as a coil mounting surface substantially parallel to the upper surface 22a and a pair of inclined side surfaces 27b and 27c continuing upwardly from the opposite side edges of the bottom surface 27a so as to be inclined with respect to the upper surface 22a. The coil groove 27 extends in the lateral direction of the substrate 22 so as to cross the track width defining grooves 23 and 25. The inclined side surface 27b of the coil groove 27 also serves to define a depth of the magnetic gap g.

On the other hand, the glass groove 28 has a substantially U-shaped cross section such that it is formed by a bottom surface 28a substantially parallel to the upper surface 22a and a pair of vertical side surfaces 28b and 28c continuing upwardly from the opposite side edges of the bottom surface 28a so as to be perpendicular to the upper surface 22a. The glass groove 28 extends in the lateral direction of the substrate 22 in parallel relationship to the coil groove 27 so as to cross the track width defining grooves 23 and 25.

Then, the above process is similarly repeated to prepare another magnetic core substrate 32 having a plurality of track width defining grooves 33 and 35, magnetic gap forming portions 36, a flat portion 34, a coil groove 37 and a glass groove 38.

Figure 20:
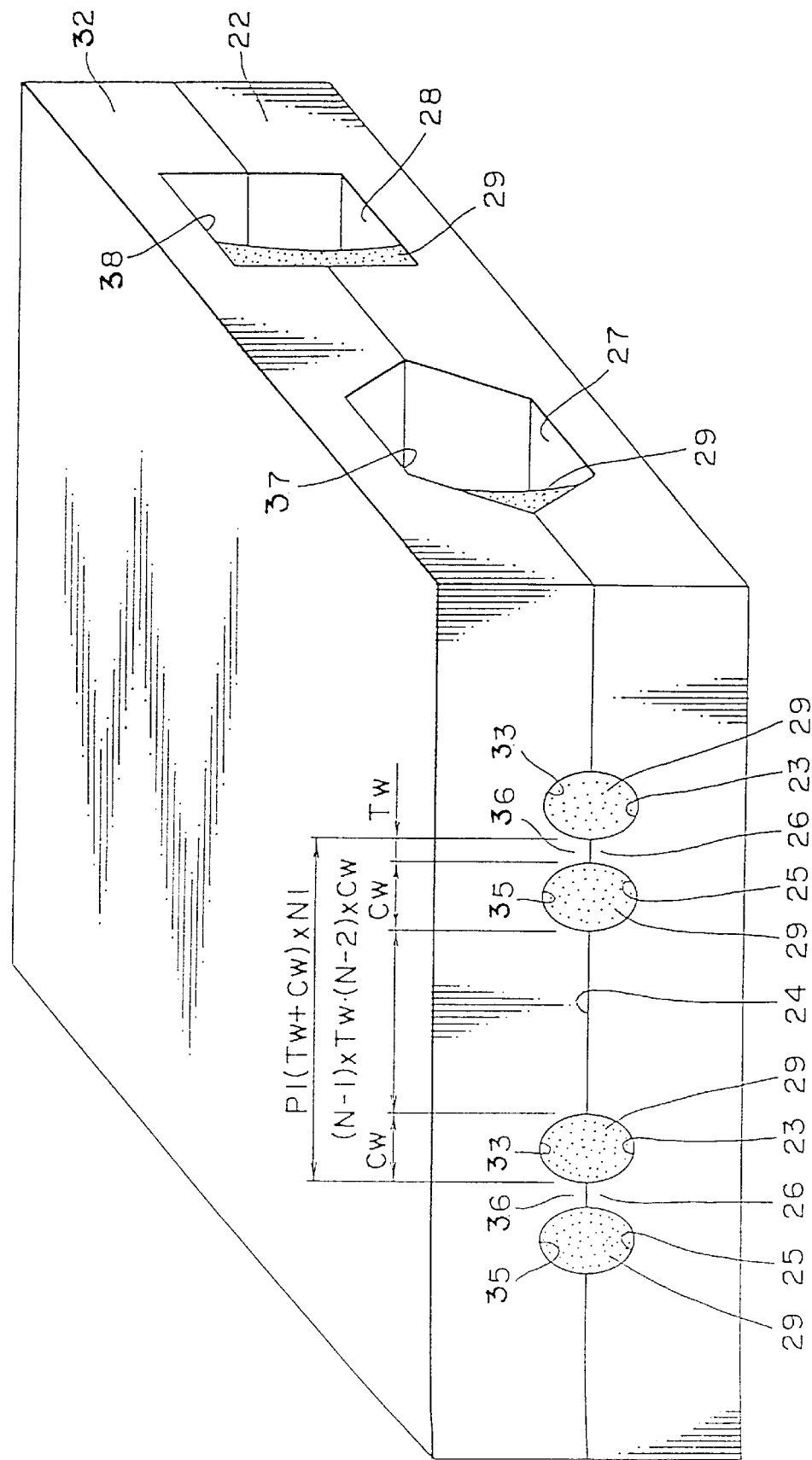
FIG. 20 is a perspective view illustrating the second step of bonding the substrate and another similar substrate to each other and filling a fusing glass in the track width defining grooves and in the vicinity of magnetic gaps after the first step shown in FIG. 19.

Then, both the substrates 22 and 32 are matched with each other so that the magnetic gap forming portions 26 of the substrate 22 face the magnetic gap forming portions 36 of the substrate 32 as shown in FIG. 20.

Before matching both the substrates 22 and 32 as mentioned above, a gap spacer (not shown) having a thickness corresponding to a predetermined gap length is interposed between the opposed surfaces of the substrates 22 and 32 except the magnetic gap forming surfaces. Alternatively, gap films (not shown) such as $SiO_2$ films may be formed on the opposed surfaces of the substrates 22 and 32.

Then, glass rods (not shown) are inserted into a space defined by the coil grooves 27 and 37 and a space defined by the glass grooves 28 and 38, and the glass rods are then heated to be fused under the pressure applied to the lower surface of the substrate 22 and the upper surface of the substrate 32 as viewed in FIG. 20.

Since the flat portions 24 and 34 each having a width at least three times the track width Tw are formed on the opposed surfaces of the blocks 22 and 32, the pressure to be applied to the opposed surfaces to be bonded together can be reduced by the wide flat portions 24 and 34 to thereby greatly reduce a stress in the magnetic core substrates 22 and 32. Accordingly, the magnetic characteristics of the substrates 22 and 32 are not be deteriorated, and it is expected that the reproduction efficiency of the magnetic head to be obtained can be improved. Furthermore, since the pressure is reduced, there is no possibility of the magnetic gap forming portions 26 and 36 being deformed.

After the glass rods are fused as mentioned above, both the substrates 22 and 32 are bonded together by a fusing glass 29 as shown in FIG. 20. The fusing glass 29 is also filled in the track width defining grooves 23 and 25 of the substrate 22 and the track width defining grooves 33 and 35 of the substrate 32, thereby ensuring a contact characteristic with respect to a magnetic recording medium.

Figure 21:
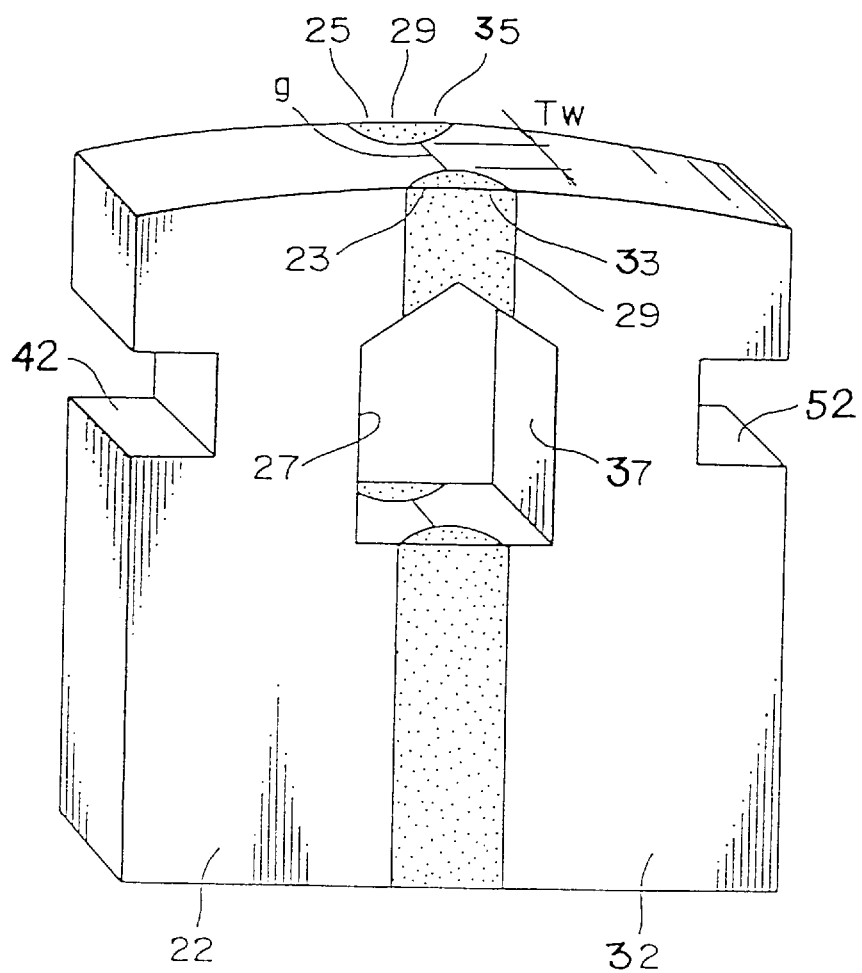
FIG. 21 is a perspective view of a magnetic head obtained after the second step shown in FIG. 20.

Then, an integrated body of the substrates 22 and 32 is cut into a plurality of head chips (two chips in this preferred embodiment) (not shown). Then, a magnetic recording medium sliding surface of each head chip is subjected to cylindrical grinding. Further, as shown in FIG. 21, a pair of recesses 42 and 52 for receiving coils are formed by cutting the substrates 22 and 32, thus obtaining a magnetic head.

In the magnetic head thus manufactured, the pressure to be applied to the opposed surfaces of the substrates 22 and 32 in the glass fusing step can be reduced by the flat portions 24 and 34. Accordingly, the magnetic characteristics of the substrates 22 and 32 are prevented from being deteriorated, thereby obtaining a high reproduction efficiency. Furthermore, the magnetic gap forming portions 26 and 36 forming the magnetic gap g are not deformed by the pressure applied the glass fusing step, thereby maintaining the accurate track width Tw.

Figure 23:
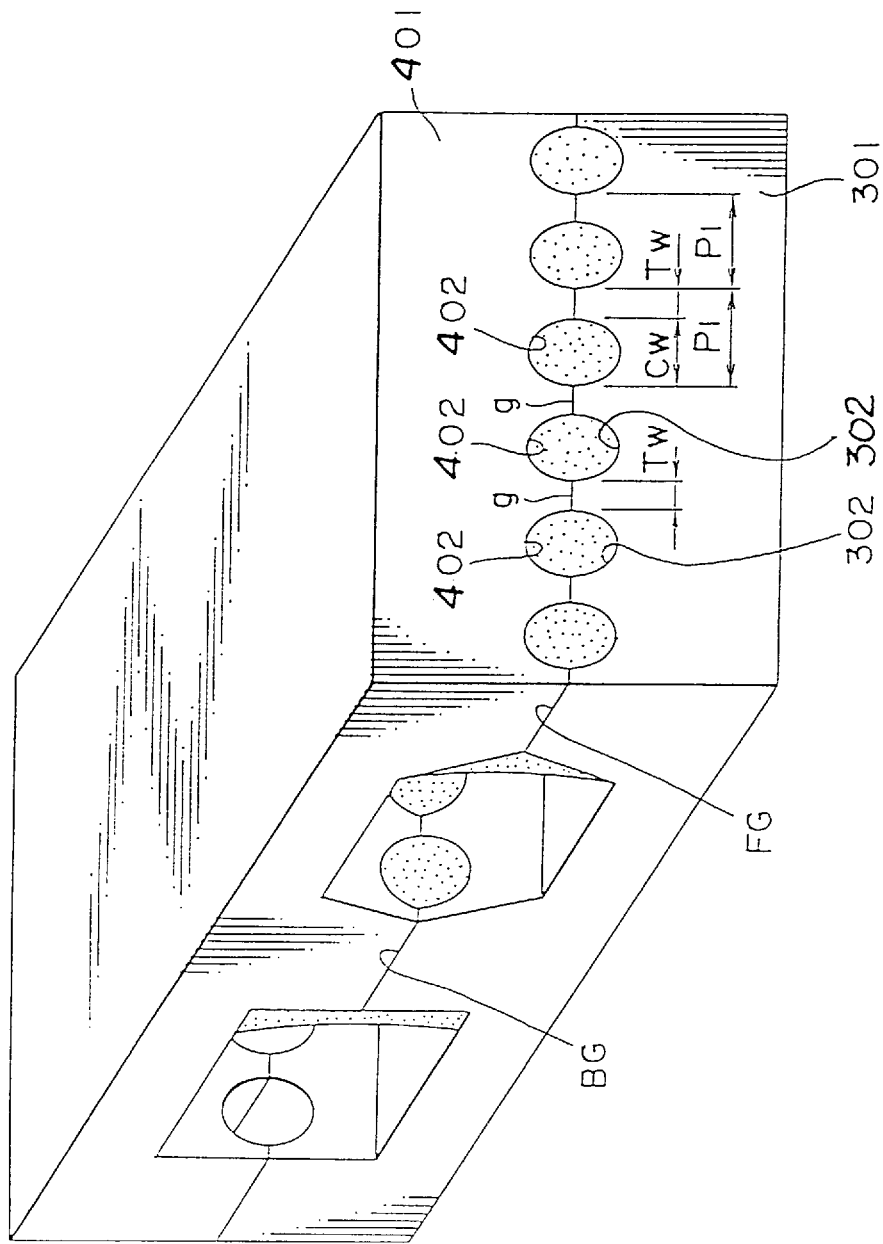
FIG. 23 is a perspective view similar to FIG. 20, illustrating a conventional manufacturing method for a magnetic head.
Figure 24:
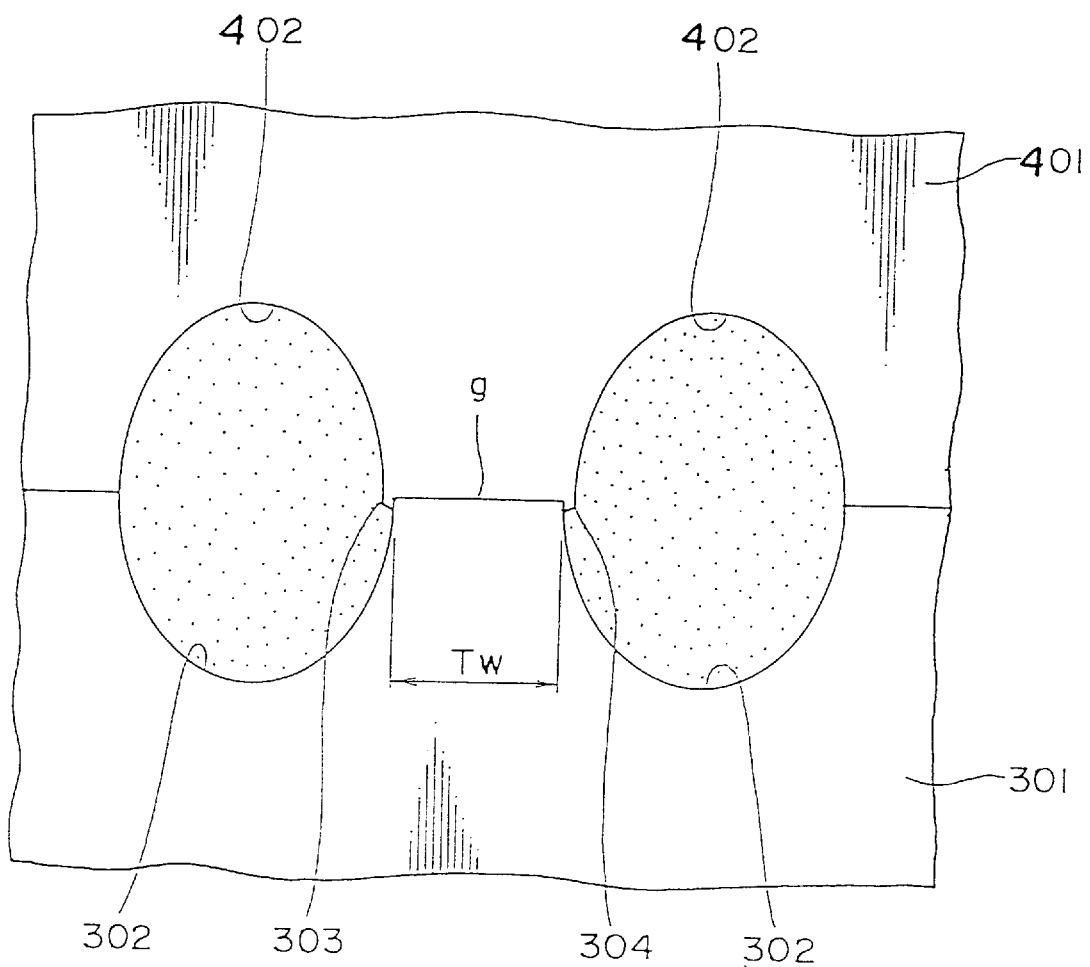
FIG. 24 is an enlarged elevational view of an essential part in FIG. 23.
Figure 25:
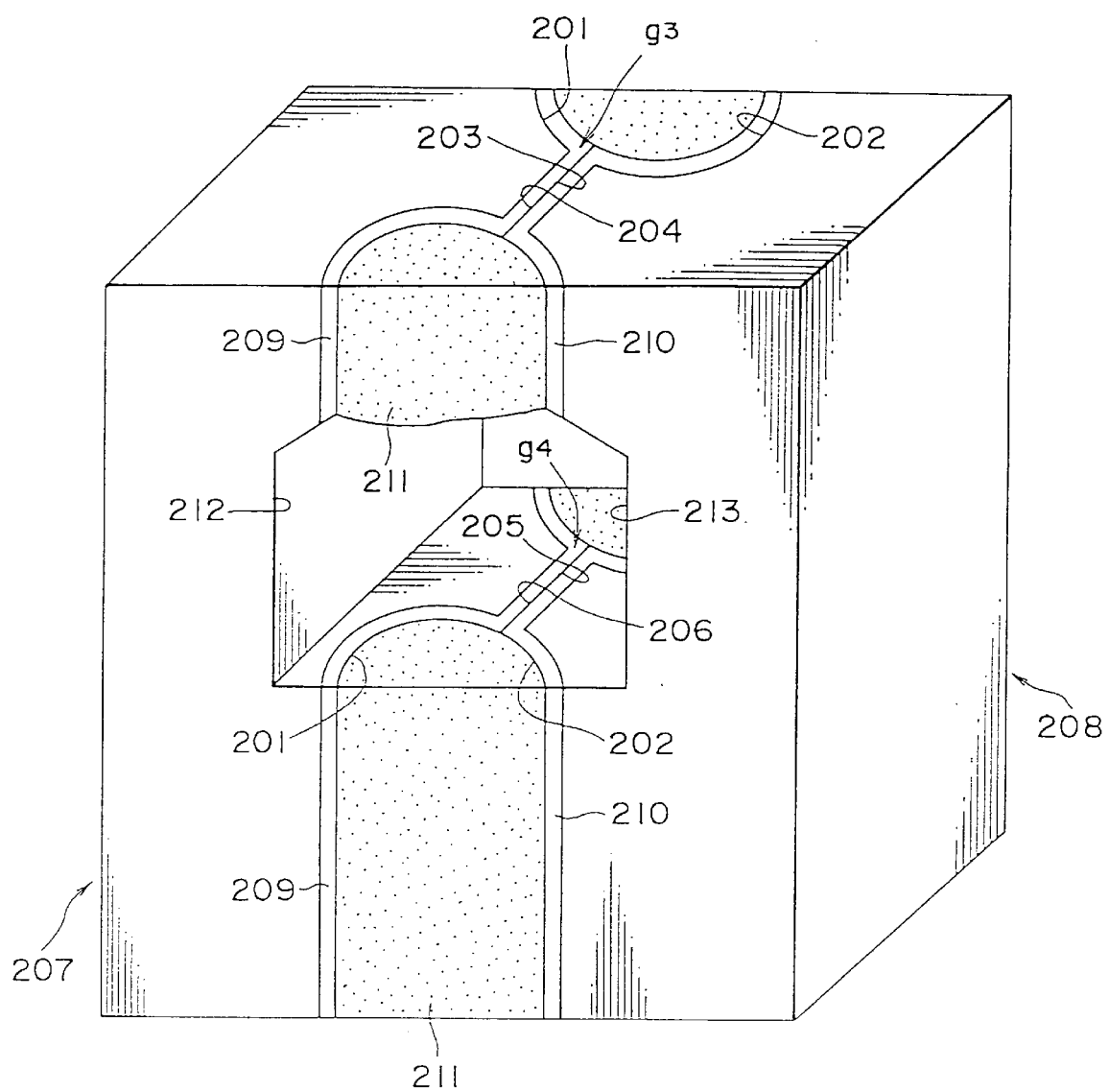
FIG. 25 is a perspective view of a magnetic head in the related art.
Figure 26:
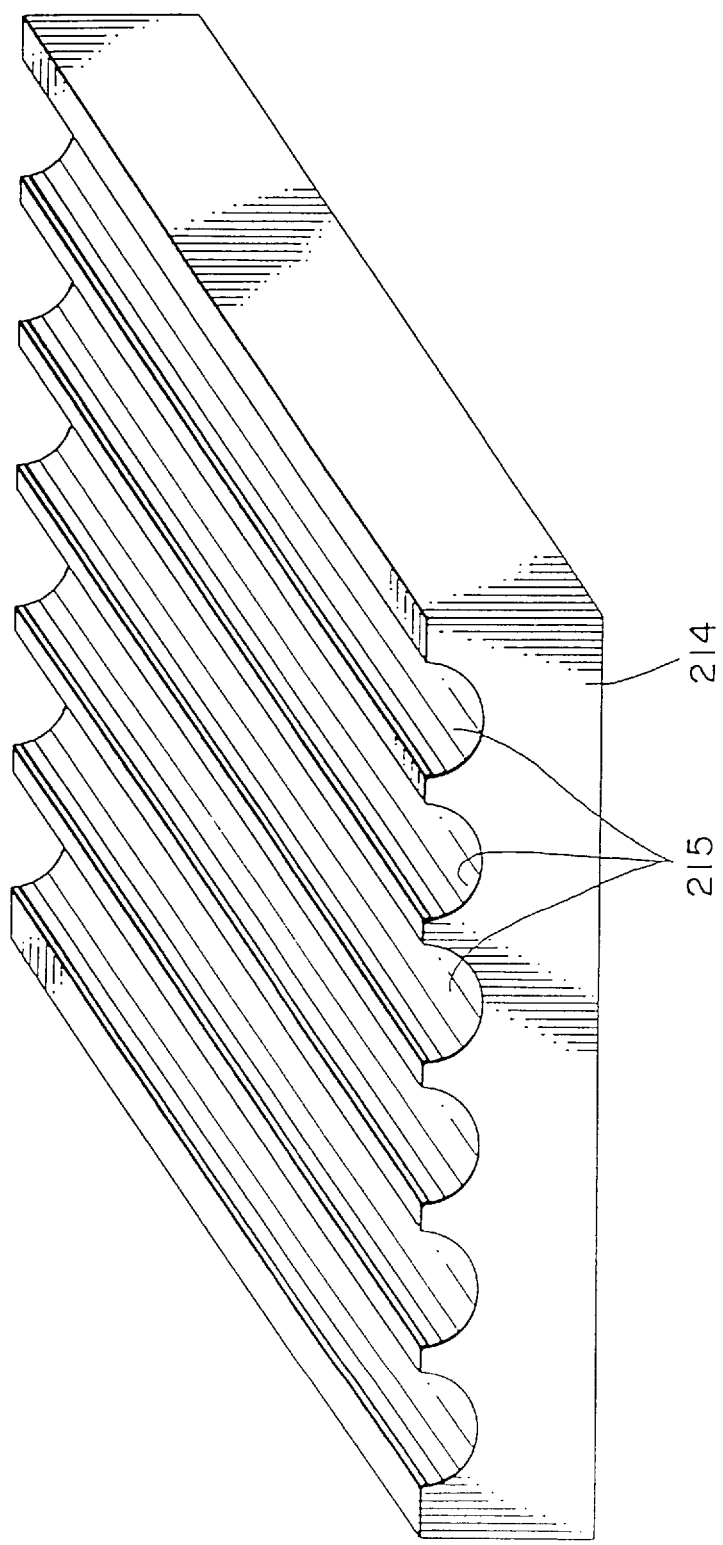
FIG. 26 is a perspective view illustrating the first step of forming track width defining grooves on a substrate in a conventional manufacturing method for the magnetic head shown in FIG. 25.
Figure 27:
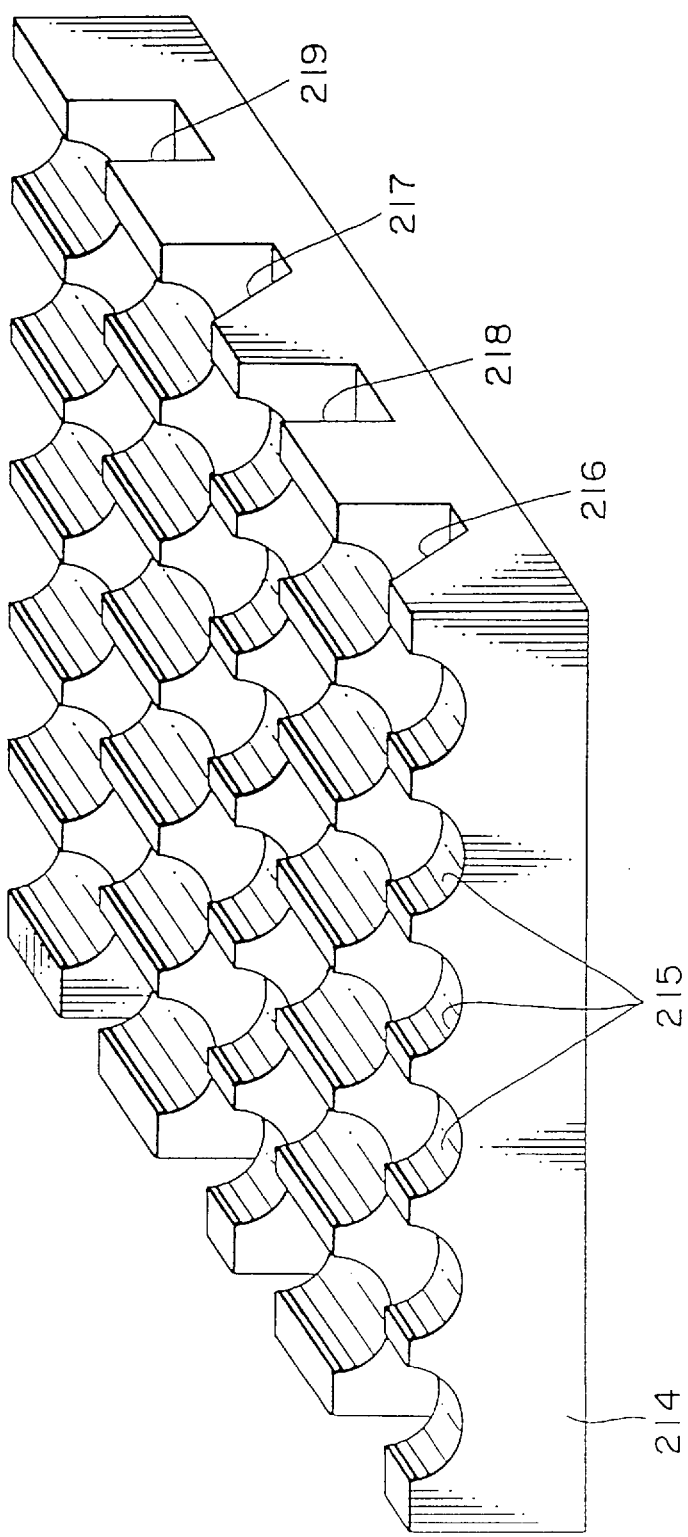
FIG. 27 is a perspective view illustrating the second step of forming coil grooves and glass grooves on the substrate after the first step shown in FIG. 26.
Figure 28:
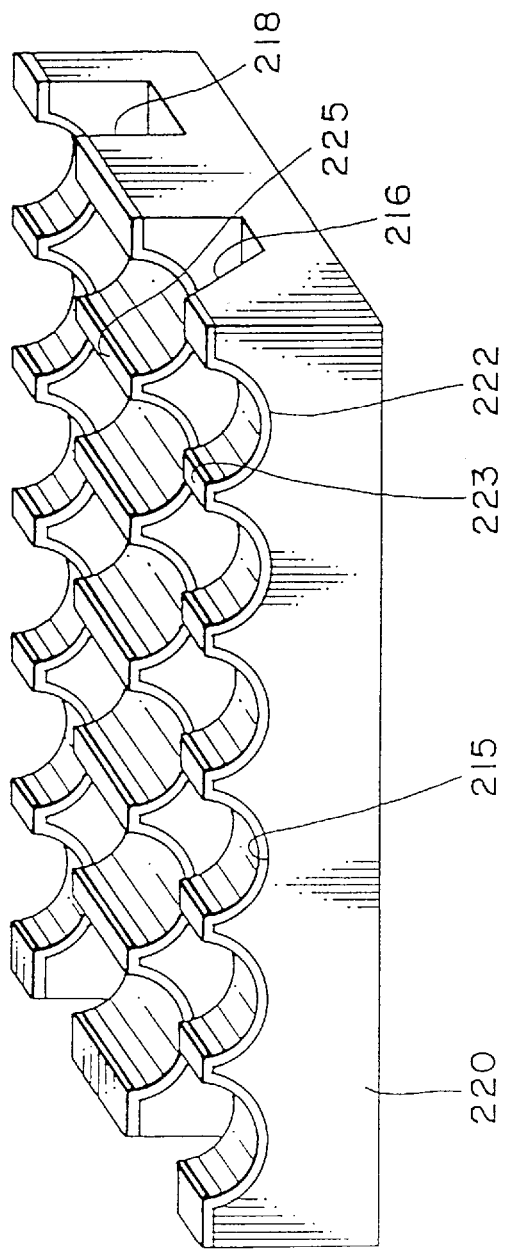
FIG. 28 is a perspective view illustrating the third step of dividing the substrate into a pair of blocks and forming a gap film on each block after the second step shown in FIG. 27.
Figure 29:
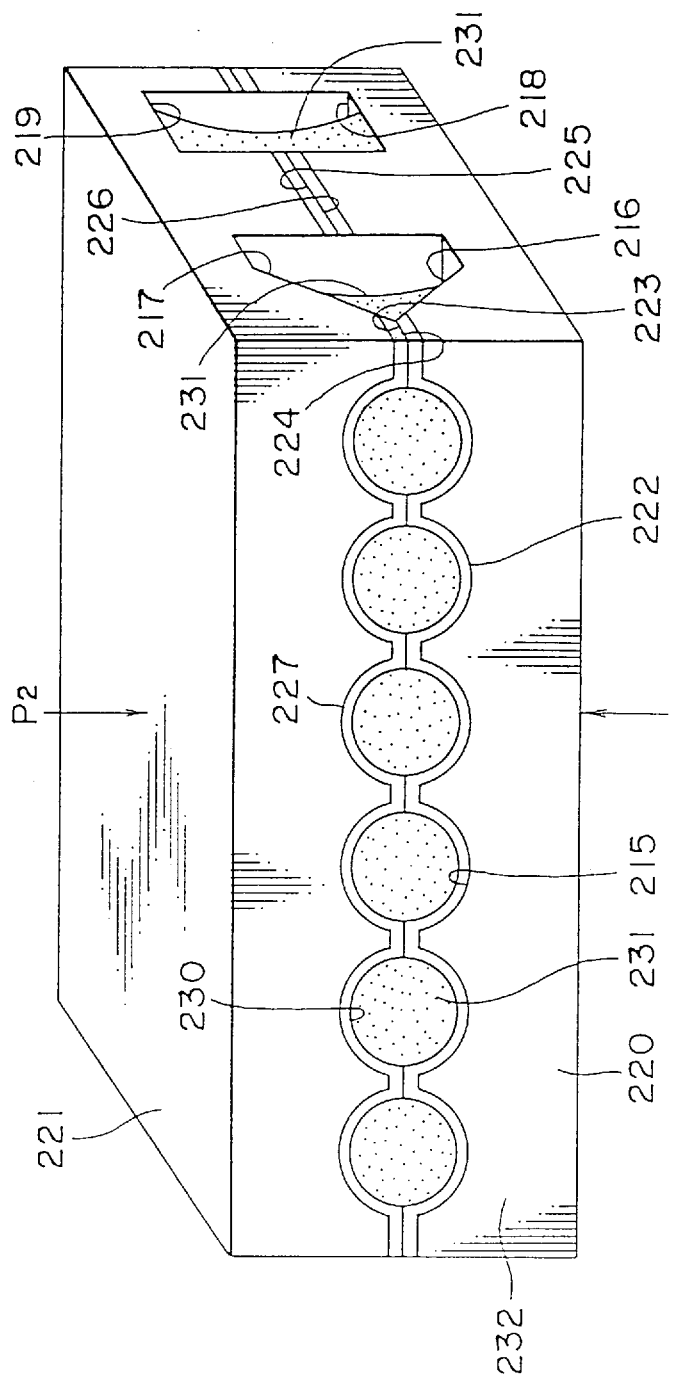
FIG. 29 is a perspective view illustrating the fourth step of locating a nonmagnetic material in the coil grooves and the glass grooves and bonding the pair of blocks together by the nonmagnetic material after the third step shown in FIG. 28.

FIG. 23 shows a conventional manufacturing method for a magnetic head, in which a plurality of track width defining grooves 302 are formed on a magnetic core substrate 301 at a given pitch P1, and a plurality of track width defining grooves 402 are similarly formed on a magnetic core substrate 401 at the same pitch P1. Both the substrates 301 and 401 are bonded together so that a magnetic gap g having a track width Tw is defined by the adjacent ones of the track width defining grooves 302 and the adjacent ones of the track width defining grooves 402. In this case, a bonding area of each of the substrates 301 and 401 in one pitch P1 is calculated as (Track width Tw)×(Depth of a front gap FG+Depth of a back gap BG). Accordingly, a large pressure is applied to the magnetic gap forming surfaces of the substrates 301 and 401 to cause a deterioration in magnetic characteristics of the substrates 301 and 401 and a reduction in reproduction efficiency of the magnetic head. Furthermore, as shown in FIG. 24, the magnetic gap forming surface of the substrate 401 is deformed at its opposite ends 303 and 304 so as to penetrate into the substrate 301 by the large pressure.

There will now be described in more detail the reason why the stress damage of the substrates 22 and 32 can be reduced by forming the flat portions 24 and 34 each having a width at least three times the track width Tw on the substrates 22 and 32. In the following description, the reduction in the stress damage of the substrate 22 only having the front portion 24 will be examined because the other substrate 34 has the same structure as that of the substrate 22.

It is assumed that the pitch P of the grooves 23 formed on the substrate 22 is set to be N times the pitch P1 (=Cw+Tw) of the grooves 302 shown in FIG. 23, wherein Tw represents the track width which is the width of each magnetic gap forming surface, and Cw represents the width of each track width defining groove 23 in the same plane as the magnetic gap forming surface.

In the preferred embodiment, a bonding area S1 of the substrate 22 in one pitch P assuming that a length in the depth direction is 1 is expressed as follows:

$$S1=(Tw+Cw) \times N - 2 \times Cw \qquad (3)$$

On the other hand, in the related art shown in FIG. 23, a bonding area S2 of the substrate 301 in one pitch P1 assuming that a length in the depth direction is 1 is expressed as follows:

$$S2=Tw \times N \qquad (4)$$

Accordingly, the ratio between the bonding areas S1 and S2 is expressed as follows:

$$S1/S2=[(Tw+Cw) \times N - 2 \times Cw]/(Tw \times N)=(1+Cw/Tw)-Cw/Tw \times 2/N \qquad (5)$$

When the track width Tw is reduced from 20 $\mu$m to 10 $\mu$m, it is understood from Expression (4) that the bonding area S2 in the related art becomes half that in the case of Tw=20 $\mu$m, and accordingly the pressure in the bonding area S2 becomes twice that in the case of Tw=20 $\mu$m.

Further, in the case of Tw=10 $\mu$m and Cw=190 $\mu$m, the ratio of the bonding areas S1 and S2 is calculated from Expression (5) to give:

$$S1/S2=20-38/N \qquad (6)$$

That is, the bonding area S1 in the preferred embodiment is (20−38/N) times the bonding area S2 in the related art.

Further, when N=3 is inserted into Expression (6) (i.e., the pitch P is three times the pitch P1), the following value is given.

$$S1/S2 = 22/3 \tag{7}$$

That is, the bonding area S1 in the preferred embodiment is 22/3 times (i.e., a little over seven times) the bonding area S2 in the related art. In other words, the pressure in the bonding area S1 in the preferred embodiment is 3/22 times the pressure in the bonding area S2 in the related art.

Further, in the case of Tw=20 µm and Cw=190 µm, the ratio of the bonding areas S1 and S2 becomes as follows:

$$S1/S2 = 25/6 \tag{8}$$

That is, the bonding area S1 in the preferred embodiment is 25/6 times (i.e., a little over four times) the bonding area S2 in the related art. In other words, the pressure in the bonding area S1 is 6/25 times the pressure in the bonding area S2.

It is understood from Expression (6) that the ratio of the pressure F1 in the bonding area S1 to the pressure F2 in the bonding area S2 in the case of Tw=10 µm and Cw=190 µm becomes as follows:

$$F1/F2 = (20-38/N)^{-1} \tag{9}$$

For example, if the following inequality is given (i.e., if the pressure F1 in the preferred embodiment is not greater than half the pressure F2 in the related art), $$(20-38/N)^{-1} \leq \tfrac{1}{2} \tag{10}$$

then the value of N is calculated as follows:

$$N \geq 38/18 \tag{11}$$

On the other hand, the width Fw of the flat portion 24 is expressed as follows:

$$Fw = (N-1) \times Tw + (N-2) \times Cw \tag{12}$$

In the case of Tw=10 µm, Cw=190 µm and N≧38/18, it is understood from Expression (12) that the width Fw of the flat portion 24 becomes about 32 µm or more, which is at least three times the track width Tw=10 µm. Accordingly, by setting the width Fw of the flat portion 24 to a value at least three times the track width Tw, the pressure F1 in the bonding area S1 can be reduced to a value not more than half the pressure F2 in the bonding area S2. Thus, the pressure applied to the opposed surfaces of both the magnetic core substrates in the glass fusing step according to the preferred embodiment can be greatly reduced to thereby easily control a stress in the magnetic core substrates.

The present inventors actually prepared a ferrite head in accordance with the above preferred embodiment under the conditions of Tw=10 µm, Cw=190 µm and N=3, and evaluated the reproduction efficiency of the ferrite head by using an 8-mm video tape recorder (NTSC). In this case, a gap length was set to 0.25 µm and an inductance was 0.7 µH (5 MHz). As the result of evaluation, an increase in reproduction output by 1.5 dB as compared with the case of N=1 in the related art was confirmed. This result is considered to be due to the fact that the pressure applied to the magnetic cores in the glass fusing step was controlled.

Figure 22:
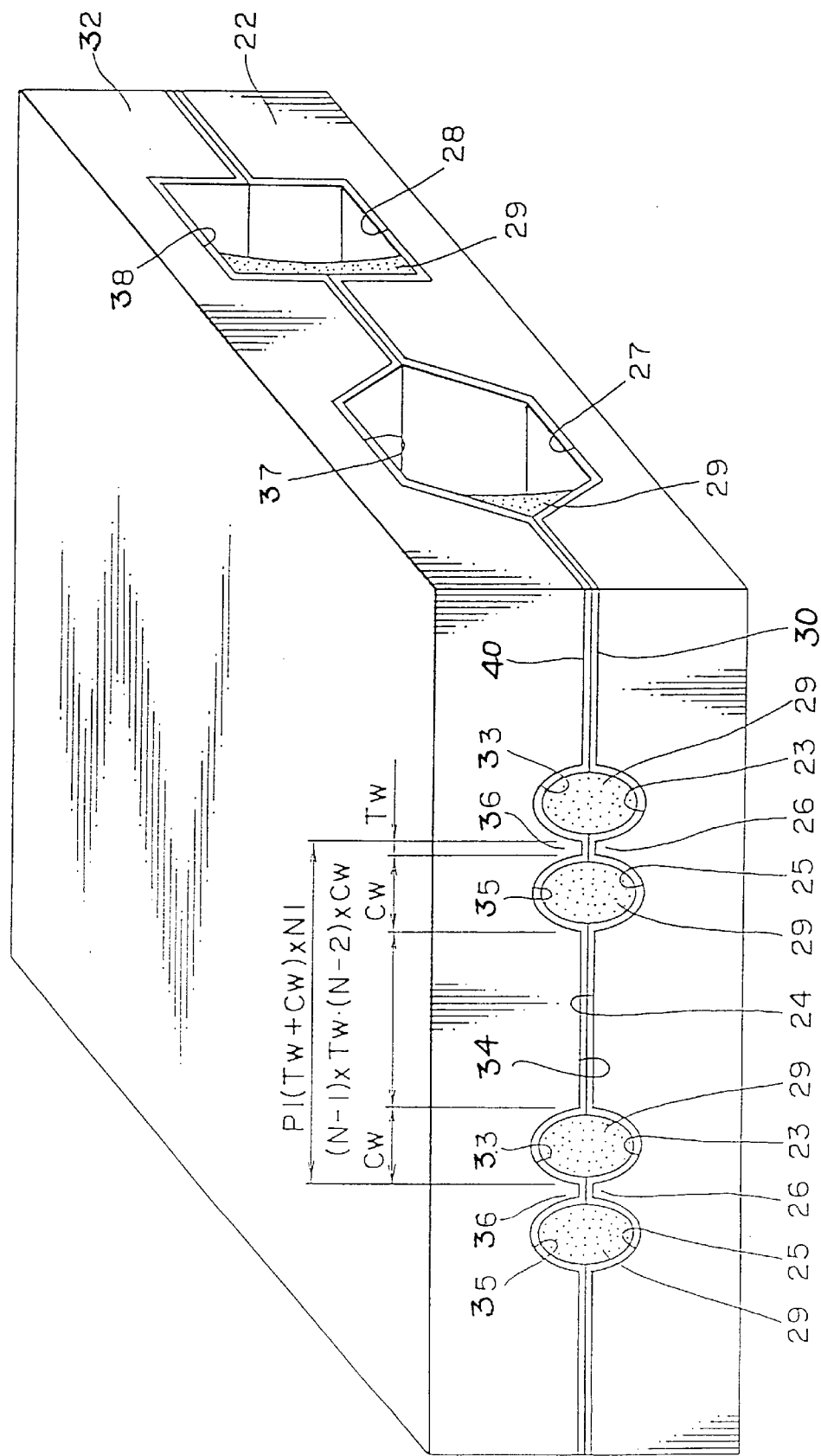
FIG. 22 is a perspective view similar to FIG. 20, illustrating a modification for manufacturing a metal-in-gap type magnetic head.

In the manufacturing method according to the second preferred embodiment mentioned above, a closed magnetic circuit is formed in the magnetic head by the monocrystal ferrite used as the material of the magnetic cores. However, the present invention may be applied to a manufacturing method for a so-called metal-in-gap type magnetic head employing a metal magnetic thin film as the material for the magnetic cores. In this case, as shown in FIG. 22, metal magnetic thin films 30 and 40 are formed on the opposed surfaces of the substrates 22 and 32, respectively, after forming the track width defining grooves 23, 25, 33 and 35, the coil grooves 27 and 37 and the glass grooves 28 and 38. Then, both the substrates 22 and 32 are matched with each other so that the metal magnetic thin films 30 and 40 face each other. Thereafter, the same process as that of the second preferred embodiment is carried out to obtain the metal-in-gap type magnetic head employing the metal magnetic thin films 30 and 40 as main cores.

The metal magnetic thin films 30 and 40 are formed of a known ferromagnetic alloy material having a high saturation magnetic flux density and a superior soft magnetic characteristic. Such a ferromagnetic alloy material may be crystalline or noncrystalline. Examples of the ferromagnetic alloy material may include crystalline alloy materials such as Fe alloys, Co alloys, Fe—Ni alloys, Fe—C alloys, Fe—Al—Si alloys, Fe—Ga—Si alloys, Fe—Al—Ge alloys, Fe—Ga—Ge alloys, Fe—Si—Ge alloys, Fe—Co—Si alloys, Fe—Ru—Ga—Si alloys and Fe—Co—Si—Al alloys, and may also include amorphous alloys such as Co—Zr—Nb alloys and Co—Zr—Nb—Ta alloys. Other amorphous alloys for general use may, of course, be used in the present invention. Such amorphous alloys may include metal-metalloid amorphous alloys such as alloys composed of at least one of Fe, Ni and Co and at least one of P, C, B and Si, or alloys mainly composed of these elements and further containing Al, Be, Sn, In, Mo, W, Ti, Mn, Cr, Zr or Hf, and may also include metal-metal amorphous alloys such as alloys mainly composed of transition elements such as Co—Zr or Co—Hf, or alloys mainly composed of these elements and further containing rare earth element.

Further, in order to further increase the output of the magnetic head and avoid eddy current loss in a high band, the metal magnetic thin film may be formed in a multilayer structure consisting of multiple metal thin layers laminated together through insulating films. The insulating films may be formed of $SiO_2$, $Ta_2O_5$, $Al_2O_3$, $ZrO_2$ or $Si_3N_4$. The formation of each metal thin layer and each insulating film may be performed by a vacuum thin film forming technique such as vacuum deposition, sputtering, ion plating, or cluster ion beam processing.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A method of manufacturing a pair of magnetic heads, each having a track width Tw, comprising the steps of:

measuring a permeability of a magnetic core material under stress;

quantifying an influence of the stress on the permeability;

obtaining a stress value corresponding to a maximum permeability of the magnetic core material in the vicinity of a magnetic recording medium sliding surface in a sliding direction before forming the magnetic heads on the basis of the influence of stress;

providing a pair of magnetic core substrates, composed of said magnetic core material, the magnetic permeability of which varies under compressive stress;

forming a plurality of track width defining grooves at a given pitch on each of a pair of magnetic core substrates so that a flat portion having a width at least three times a track width Tw remains on each of said magnetic core substrates;

forming a coil groove for receiving a coil on each of said magnetic core substrates so that said coil groove extends in a substantially orthogonal relationship to said track width defining grooves;

providing a first fusing glass film on a portion of each core half member;

placing said magnetic core substrates in registry and subjecting the magnetic core substrates to a pressure in the presence of heat effective to bond said magnetic core substrates together with said first fusing glass film, said pressure being selected such that said stress value corresponding to the maximum permeability of said magnetic core material is attained and said maximum magnetic permeability is realized, said bonded magnetic core substrates forming an integral body;

thereafter providing a second fusing glass in spaces defined by said gap width delimiting grooves, the said second fusing glass having a glass transition point which is lower than a flexure point of said first fusing glass; and cutting said integral body into a pair of head chips.

2. The method of claim 1, wherein said first fusing glass film is deposited over all abutting surfaces of said core member halves.

3. The method of claim 1, wherein each core member half has fusing glass receiving grooves formed therein and extending in a direction parallel to said coil receiving recesses.

4. A method of manufacturing a pair of magnetic heads, each having a track width Tw, comprising the steps of:

measuring a permeability of a magnetic core material under stress;

quantifying an influence of the stress on the permeability;

obtaining a stress value corresponding to a maximum permeability of the magnetic core material in the vicinity of a magnetic recording medium sliding surface in a sliding direction before forming the magnetic heads on the basis of the influence of stress;

providing two core half members composed of magnetic core material, each core half member having one-half of each of said magnetic heads, each core half member having a plurality of track width delimiting grooves extending in one direction and a coil receiving recess formed in a direction perpendicular to that of the gap width delimiting grooves, said track width defining grooves at a given pitch on each of said core half members so that a flat portion having a width at least three times a track width Tw remains on each of said core half members;

providing a first fusing glass film on a portion of each core half member;

mating said core half members at a pressure and in the presence of heat effective to bond said core half members together with said first fusing glass film, said pressure being selected such that said stress value corresponding to the maximum permeability of said magnetic core material is attained and said maximum magnetic permeability is realized; and thereafter providing fusing glass in spaces defined by said gap width delimiting grooves, said second fusing glass having a glass transition point which is lower than a flexure point of said first fusing glass.

5. The method as defined in claim 4, wherein said step of bonding said magnetic gap forming portions comprises thermal diffusion of a metal film at low temperatures.

6. The method as defined in claim 4, wherein said step of bonding said magnetic gap forming portions comprises heating of a fusing glass.

7. The method as defined in claim 4, wherein said nonmagnetic material to be filled in the vicinity of said magnetic gap is a fusing glass having a glass transition point lower than a flexure point of said fusing glass to be used for bonding of said magnetic gap forming portions.

8. The method of claim 4, wherein said first fusing glass film is deposited over all abutting surfaces of said core member halves.

9. The method of claim 4, wherein each core member half has fusing glass receiving grooves formed therein and extending in a direction parallel to said coil receiving recesses.

* * * * *